(12) United States Patent
Kita

(10) Patent No.: US 7,949,247 B2
(45) Date of Patent: May 24, 2011

(54) IMAGING APPARATUS INCLUDING STROBE LIGHT EMITTING FUNCTION

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 562 days.

(21) Appl. No.: 12/002,230

(22) Filed: Dec. 14, 2007

(65) Prior Publication Data

US 2008/0175580 A1 Jul. 24, 2008

(30) Foreign Application Priority Data

Dec. 15, 2006 (JP) ................................. 2006-339123

(51) Int. Cl.
  *G03B 15/03* (2006.01)
(52) U.S. Cl. ....................................... 396/164; 396/182
(58) Field of Classification Search .......... 396/164–168, 396/182; 315/241 P, 241 S
  See application file for complete search history.

(56) References Cited

U.S. PATENT DOCUMENTS

| | | | |
|---|---|---|---|
| 6,842,585 B2 * | 1/2005 | Matsuo et al. | 396/89 |
| 6,904,234 B2 * | 6/2005 | Shimizu | 396/100 |
| 6,925,255 B2 * | 8/2005 | Watanabe et al. | 396/301 |
| 7,209,652 B2 * | 4/2007 | Uenaka | 396/182 |
| 2004/0012819 A1 * | 1/2004 | Nakashige et al. | 358/3.26 |
| 2006/0067668 A1 * | 3/2006 | Kita | 396/182 |
| 2006/0087253 A1 * | 4/2006 | Chen | 315/241 P |
| 2007/0014553 A1 * | 1/2007 | Endo | 396/52 |
| 2007/0116450 A1 * | 5/2007 | Kijima | 396/111 |
| 2008/0074535 A1 * | 3/2008 | Ohsuga et al. | 348/371 |

FOREIGN PATENT DOCUMENTS

JP 6-095222 A 4/1994

* cited by examiner

*Primary Examiner* — Christopher E Mahoney
*Assistant Examiner* — Warren K Fenwick
(74) *Attorney, Agent, or Firm* — Holtz, Holtz, Goodman & Chick, PC

(57) ABSTRACT

A digital camera 1 comprising a xenon strobe light device 15 and an LED strobe light device 16, wherein, when strobe light consecutive imaging is performed when the strobe light is set to "automatically-switched strobe light", the digital camera 1 illuminates a xenon tube 27 by controlling the xenon strobe light device 15 synchronously with each instance of imaging for a predetermined number of frames, and when the number of consecutively-imaged frames exceeds a predetermined number of times, the digital camera 1 switches the strobe light to the LED strobe light, and illuminates the LED synchronously with each instance of imaging in the consecutive imaging by controlling the LED strobe light device 16.

13 Claims, 22 Drawing Sheets

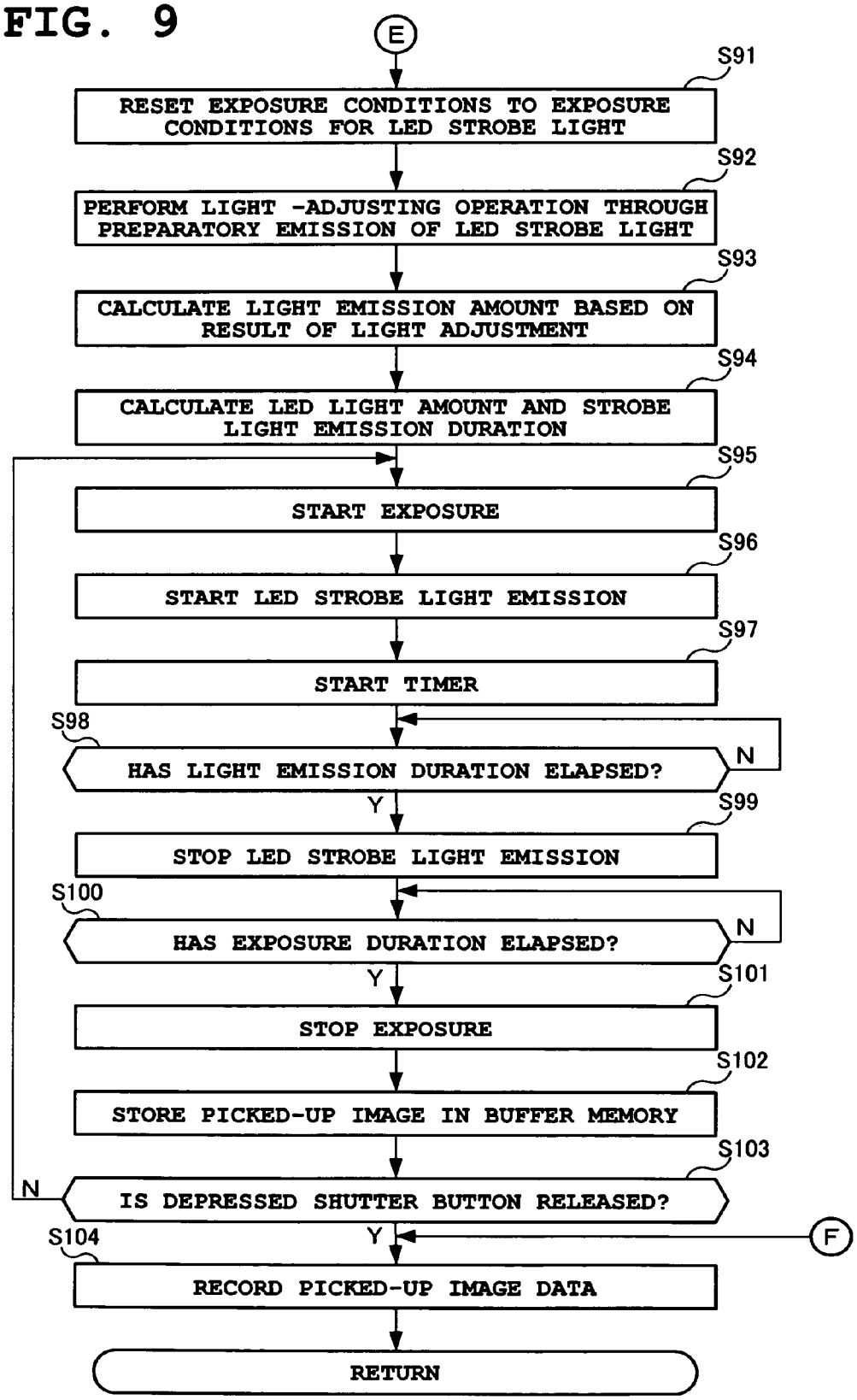

PRIOR ART
FIG. 10B

| | CORRECTION COEFFICIENT |
|---|---|
| SECOND FRAME | 1.18 |
| THIRD FRAME | 1.36 |

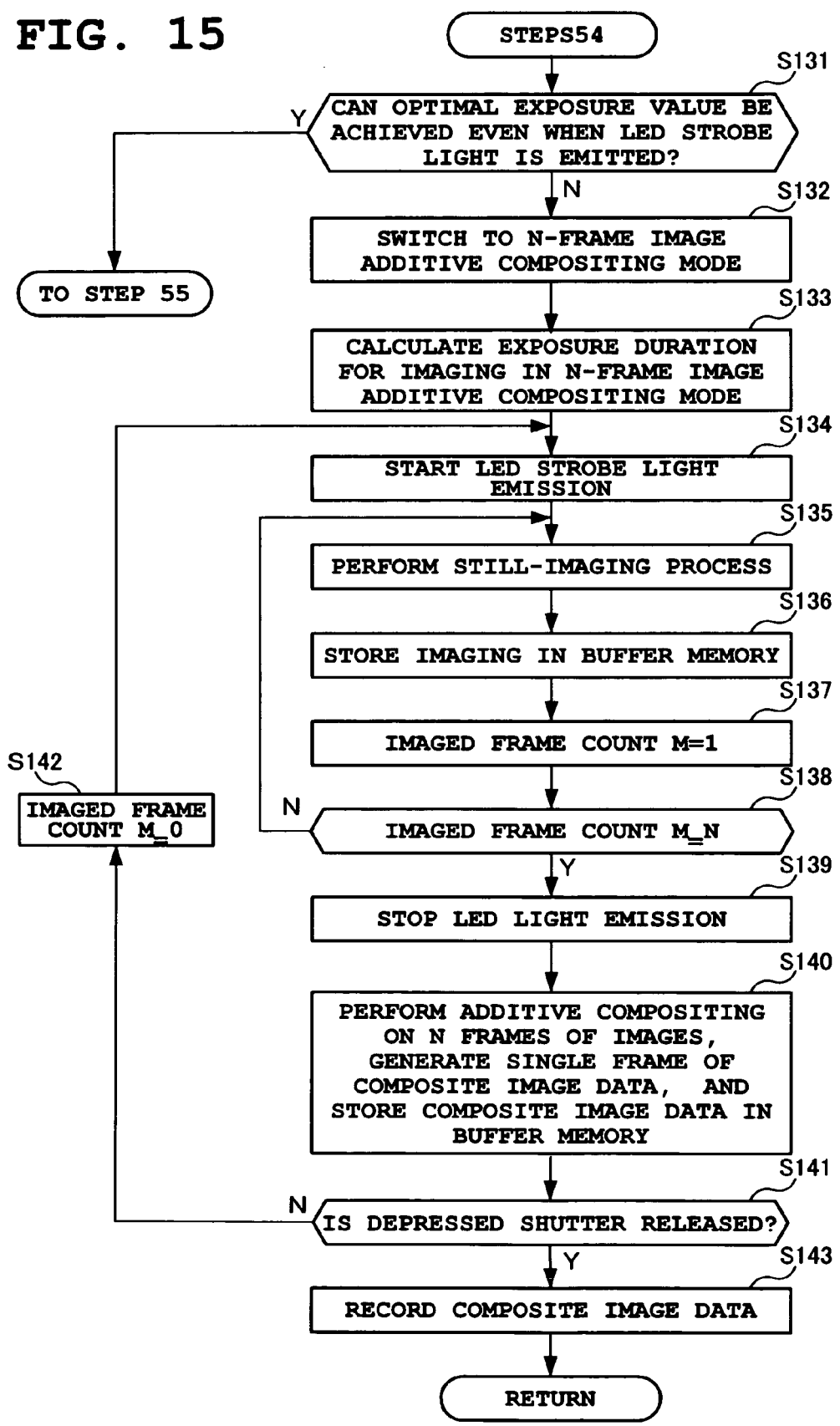

US 7,949,247 B2

IMAGING APPARATUS INCLUDING STROBE LIGHT EMITTING FUNCTION

CROSS-REFERENCE TO RELATED APPLICATION

This application is based upon and claims the benefit of priority from the prior Japanese Patent Application No. 2006-339123, filed Dec. 15, 2006, the entire contents of which is incorporated herein by reference.

BACKGROUND OF THE INVENTION

1. Field of the Invention

The present invention relates to an imaging apparatus, an imaging method, and a recording medium storing a control program thereof. The imaging apparatus emits a strobe light and images a subject.

2. Description of the Related Art

In recent years, when imaging a subject in a dark environment, an imaging apparatus, such as a digital camera, mainly emits a xenon strobe light and images the subject. This xenon strobe light includes a xenon tube and a capacitor. Electric charge (voltage) charged in the capacitor is used to flash light from the xenon tube, and then is recharged after it decreases.

Also, a consecutive-emission strobe light device including two xenon tubes has been developed (refer to Japanese Patent Laid-Open (Kokai) Publication No. Heisei 6-95222). In this technology, after one xenon tube flashes light, the other xenon tube flashes light. Thereby, the strobe light is consecutively emitted in a short time interval.

However, in the technology disclosed in Japanese Patent Laid-Open (Kokai) Publication No. Heisei 6-95222, the voltage in the capacitor drops every time the strobe light is emitted. Therefore, consecutive emission is limited, and strobe light photography cannot be performed several consecutive times. Although the strobe light can be emitted by recharging the capacitor, a certain amount of time is required to charge the capacitor, and thus, it is hard to say that strobe light photography cannot be consecutively performed.

An imaging interval at which strobe light photography is consecutively performed is also limited, and so the strobe light photography cannot be consecutively performed at a high speed.

In addition, according to Japanese Patent Laid-Open (Kokai) Publication No. Heisei 6-95222, a first light emission (emission by one xenon tube) and a second light emission (emission by the other xenon tube) may be consecutively performed in a very short time interval. However, strobe light photography cannot be performed several consecutive times. When the imaging interval is shortened (when imaging speed increases), a process of charging the capacitor and emitting the strobe light cannot be performed in time. The strobe light cannot be synchronously emitted each time imaging is performed.

SUMMARY OF THE INVENTION

In accordance with one aspect of the present invention, there is provided an imaging apparatus, comprising: an image sensor element for converting light of a subject to image data; a xenon tube; a solid light-emitting element; a consecutive imaging controlling section for controlling the image sensor element so that the subject is imaged a plurality of times at a predetermined imaging interval; and a light emission controlling section for controlling the xenon strobe light and the solid light-emitting element strobe light so as to emit during each instance of imaging by the consecutive imaging controlling section.

In accordance with another aspect of the present invention, there is provided an imaging apparatus comprising: a image sensor element for converting light of a subject to image data; a xenon tube; a solid light-emitting element; a consecutive imaging controlling section for performing a consecutive imaging process in which the subject is consecutively imaged at a predetermined imaging interval, depending on a consecutive imaging instruction; a deciding section for deciding whether to emit the xenon strobe light or the solid light-emitting element strobe light for each instance of imaging in the consecutive imaging process performed by the consecutive imaging controlling section; and a light emission controlling section for emitting the strobe light that has been decided by the deciding section for each instance of imaging in the consecutive imaging process performed by the consecutive imaging controlling section.

In accordance with another aspect of the present invention, there is provided a computer program product for controlling an imaging apparatus including an image sensor element for converting light of a subject to image data, a xenon tube, and a solid light-emitting element, stored on a computer-readable storage medium that is executable by a computer, comprising: a consecutive imaging controlling process for controlling consecutive imaging to image the subject at a predetermined imaging interval using the image sensor element that converts the light of the subject to image data; and a light emission controlling process for controlling the xenon strobe light and the solid light-emitting element strobe light such as to emit the xenon strobe light for every instance of imaging by the consecutive imaging controlling section and, when a number of times the xenon strobe light is emitted exceeds a predetermined number of times, switches from the xenon strobe light to the solid light-emitting element strobe light and emits the solid light-emitting element strobe light.

In accordance with another aspect of the present invention, there is provided a method for controlling an imaging apparatus including an image sensor element for converting light of a subject to image data, a xenon tube, and a solid light-emitting element, comprising: a setting step of performing setting such that any one of consecutive imaging processes, among xenon strobe light consecutive imaging process, a solid light-emitting element strobe light consecutive imaging process, and an automatically-switched strobe light consecutive imaging process, is performed; a starting step of starting a consecutive imaging process for imaging the subject for only a predetermined number of times at a predetermined imaging interval, using the image sensor element; and a light-emitting step of emitting only the xenon strobe light at each instance of imaging when the consecutive imaging process is set to the xenon strobe light consecutive imaging process at the setting step, emitting only the solid light-emitting element strobe light at each instance of imaging when the consecutive imaging process is set to the solid light-emitting element strobe light consecutive imaging process at the setting step, and selects one of either the xenon strobe light or the solid light-emitting element strobe light for each instance of imaging when the consecutive imaging process is set to the automatically-switched strobe light consecutive imaging process at the setting step, in the consecutive imaging process started at the starting step.

In accordance with another aspect of the present invention, there is provided a method for controlling an imaging apparatus including an image sensor element for converting light of a subject to image data, a xenon tube, and a solid light-emitting element, comprising: a starting step of starting a consecutive imaging process for consecutively imaging the subject at a predetermined imaging interval, depending on an instruction for consecutive imaging; a deciding step of deciding whether to emit the xenon strobe light or the solid light-emitting element strobe light in each instance of imaging in the consecutive imaging process started at the starting step; and an imaging step of emitting the strobe light decided by the deciding step and performing an imaging and recording of the subject by the image sensor element at each instance of imaging in the consecutive imaging process started at the starting step.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 9 is a flowchart of operations performed by the digital camera 1 according to the first embodiment;

FIG. 10B is a time chart of the voltages at the main capacitor;

FIG. 15 is a flowchart of operations performed by a digital camera 1 according to a third embodiment;

DETAILED DESCRIPTION OF THE PREFERRED EMBODIMENTS

An example of the present invention according to a first embodiment applied to a digital camera will hereinafter be described in detail, with reference to the accompanying drawings.

A. First Embodiment

A-1. Configuration of the Digital Camera

Figure 1A:
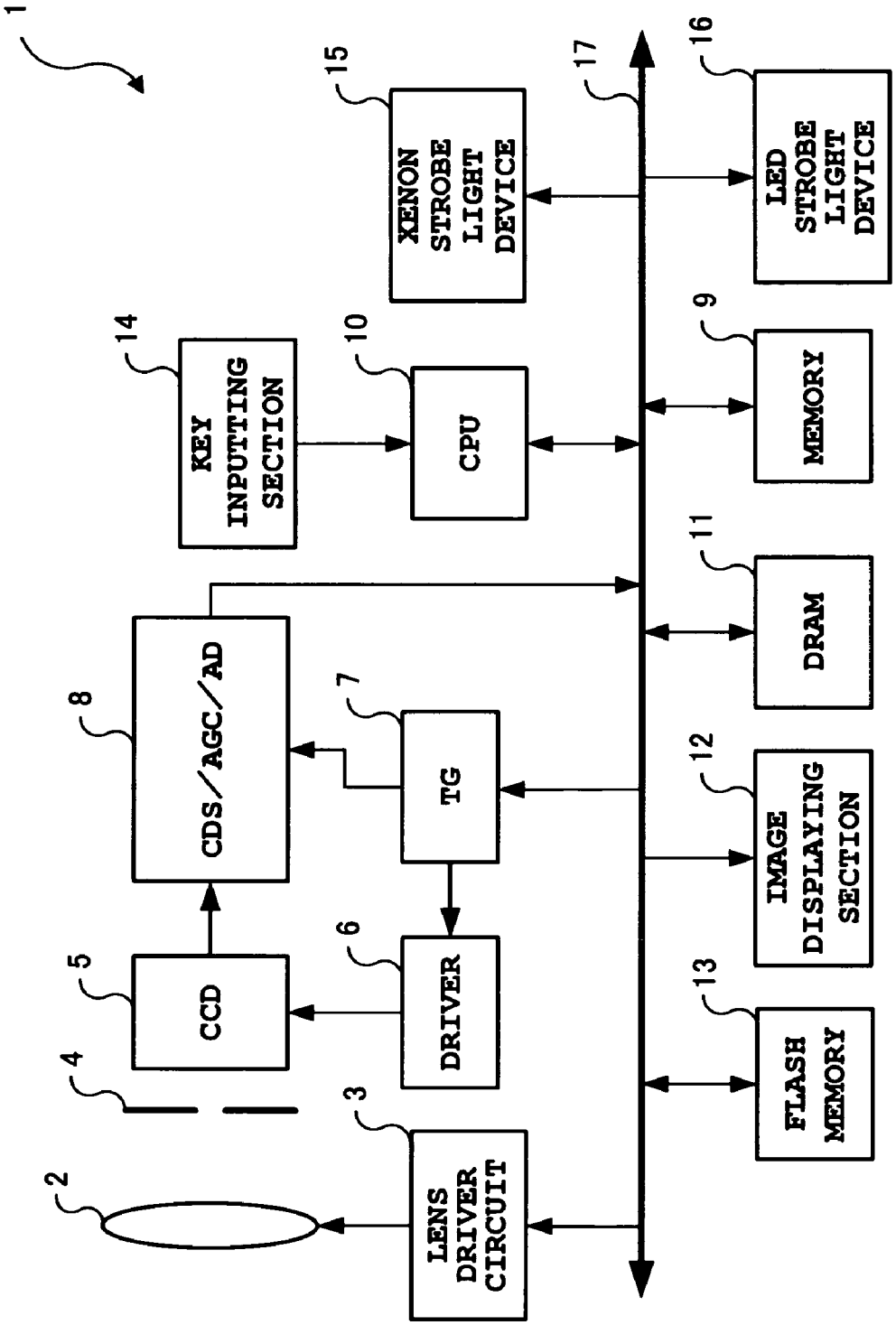
FIG. 1A is a block diagram of a digital camera 1 according to a first embodiment of the present invention.

FIG. 1A is a block diagram showing an overall electrical schematic of a digital camera 1 actualizing an imaging apparatus of the invention.

The digital camera 1 includes an imaging lens 2, a lens driver circuit 3, a combination aperture and shutter 4, a charge-coupled device (CCD) 5, a driver 6, a timing generator (TG) 7, a unit circuit 8, a memory 9, a central processing unit (CPU) 10, a dynamic random-access memory (DRAM) 11, an image displaying section 12, a flash memory 13, a key-inputting section 14, a xenon strobe light device 15, a light-emitting diode (LED) strobe light device 16, and a bus 17.

The imaging lens 2 includes a focusing lens, a zoom lens, and the like composed of a plurality of lens groups (not shown). The lens driver circuit 3 is connected to the focusing lens and the zoom lens (not shown).

The lens driver circuit 3 includes motors and motor drivers (not shown). The motors respectively move the focusing lens and the zoom lens in an optical axis direction. The motor drivers respectively drive the motor for the focusing lens and the motor for the zoom lens in adherence to control signals sent from the CPU 10.

The combination aperture and shutter 4 includes a driver circuit (not shown). The driver circuit operates the combination aperture and shutter 4 in adherence to a control signal sent from the CPU 10. The combination aperture and shutter 4 functions as an aperture and a shutter.

The aperture refers to a mechanism for controlling an amount of light entering the digital camera 1 from the imaging lens 2. The shutter refers to a mechanism for controlling an amount of time the CCD 5 is exposed to light. The amount of time the CCD 5 is exposed to light (exposure duration) varies depending on the speed at which the shutter opens and closes (shutter speed). The exposure of the CCD 5 varies depending on the aperture and the shutter speed.

The driver 6 drives an image sensor element, such as the CCD and the CMOS (the CCD 5, herein). The image sensor element performs a photoelectric conversion on the light intensity of each color among the red, green, and blue (RGB) values of a subject image at a constant frequency, and outputs the converted light intensity to the unit circuit 8 as an imaging signal. The CPU 10 controls operation timings of the driver 6 and the unit circuit 8, via the TG 7. The CCD 5 has color filters in a Bayer arrangement and also functions as an electronic shutter. The CPU 10 controls a shutter speed of the electronic shutter, via the driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs a correlated double sampling of the imaging signal outputted from the CCD 5 and holds the sampled imaging signal. The AGC circuit performs an automatic gain control on the sampled imaging signal. The A/D converter converts the analog imaging signal on which the automatic gain control has been performed to a digital signal. The imaging signal outputted from the CCD 5 is sent to the CPU 10 as the digital signal, via the unit circuit 8.

The CPU 10 has functions for performing image processing on image data sent from the unit circuit 8, compressing and expanding the image data, and the like. Image processing includes gamma correction, interpolation processing, white balance processing, luminance and color difference signal (YUV data) generation processing, and the like. The CPU 10 is a one-chip microcomputer controlling each section of the digital camera 1. The CPU 10 also includes a clock circuit and functions as a timer.

According to the first embodiment in particular, the CPU 10 has functions for controlling a start and termination of light emission from the xenon strobe light device 15 and the LED strobe light device 16, performing a light-adjusting operation, calculating an amount of emitted light based on a result of the light-adjusting operation, and performing consecutive imaging using the strobe light.

The memory 9 stores a control program required for the CPU 10 to control each section and required data (such as a correction factor table). The CPU 10 operates in adherence to the program. The memory 9 also has a storage area for storing information required by the invention.

The DRAM 11 is used as a buffer memory that temporarily stores the image data sent to the CPU 10 after being picked up by the CCD 5. The DRAM 11 is also used as a working memory of the CPU 10.

The image displaying section 12 includes a color liquid crystal display (LCD) and a driving circuit for the color LCD. When the digital camera 1 is in an imaging wait state, a subject imaged by the CCD 5 is displayed as a through-image. When a recorded image is reproduced, a recorded image that has been read from the flash memory 13 and expanded is displayed.

The flash memory 13 (recording section) is a recording medium storing image data picked up by the CCD 5 and the like.

The key inputting section 14 includes a plurality of operation keys, such as a shutter button, a mode switching key, a menu key, and a cross-shaped key, and outputs an operation signal to the CPU 10 based on a key operation performed by a user.

The xenon strobe light device 15 includes a main capacitor, a xenon tube, and the like, and flashes (emits) light by supplying electric charge charged in the main capacitor to the xenon tube which serves as a light source. The xenon strobe light device 15 will be described in detail below.

Figure 1B:
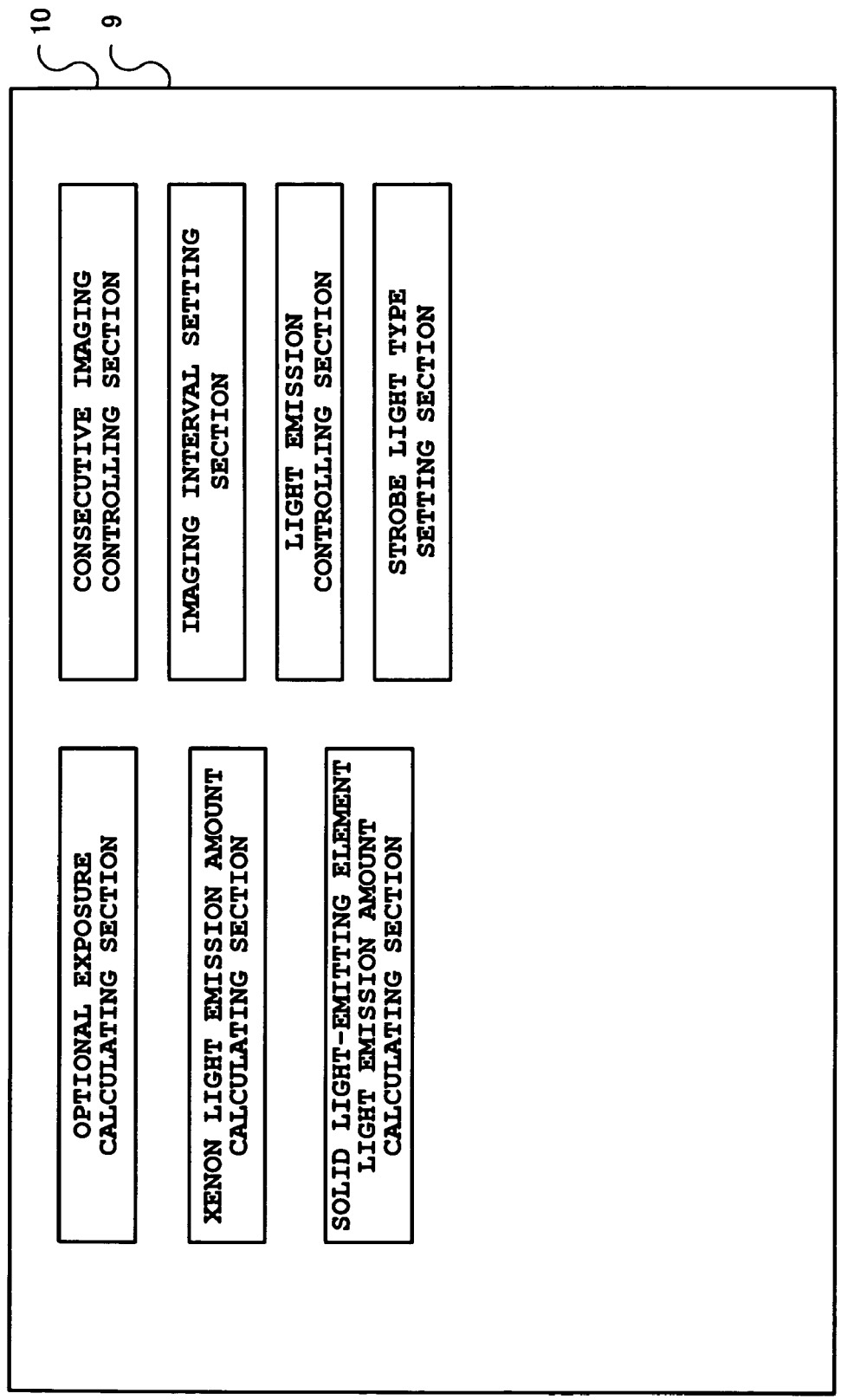
FIG. 1B is a block diagram of the digital camera 1 according to the first embodiment of the present invention.

FIG. 1B is a block diagram of various functions actualized by the CPU 10 operation in adherence to the control program and data stored in the memory 9.

The CPU 10 actualizes functions of a consecutive imaging controlling section, an imaging interval setting section, a light emission controlling section, a strobe type setting section and deciding section, an optimal exposure calculating section, a xenon light emission amount calculating section, and a solid light-emitting element light emission amount calculating section. The consecutive imaging controlling section performs control such that an object is imaged a plurality of times at a predetermined imaging interval using the image sensor element. The imaging interval setting section sets the imaging interval of the consecutive imaging. The light emission controlling section controls the emission of a xenon strobe light and a solid light-emitting element strobe light during consecutive imaging. The strobe type setting section and deciding section sets a type of strobe light to be used for the consecutive imaging. The optimal exposure calculating section calculates an optimal amount of exposure suitable for imaging the subject. The xenon light emission amount calculating section calculates an amount of xenon strobe light required to be emitted to achieve the optimal exposure amount. The solid light-emitting element light emission amount calculating section calculates an amount of solid light-emitting element strobe light required to be emitted to achieve the optimal exposure amount. According to the embodiment, each function is actualized by the CPU 10 running a portion of the program corresponding with each function. However, some or all of the functions can be actualized by a dedicated circuit.

Figure 2:
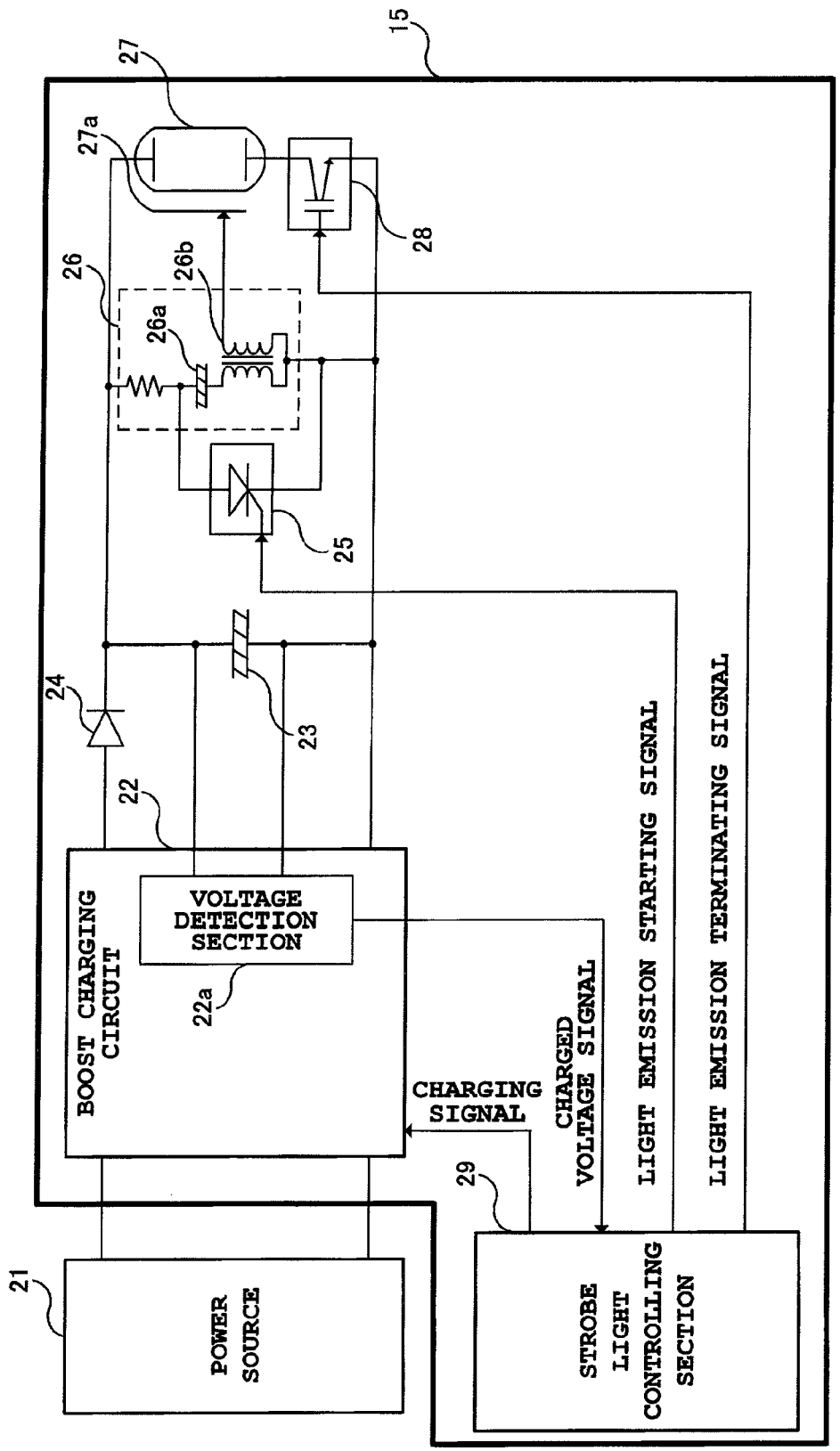
FIG. 2 is a block diagram of an overall configuration of a xenon strobe light device 15.

FIG. 2 is a block diagram of an overall configuration of the xenon strobe light device 15.

The xenon strobe light device 15 includes a boost charging circuit 22, a main capacitor 23, a diode 24, a trigger switch (SW) 25, a trigger circuit 26, a xenon tube 27, an emission terminating SW 28, and a strobe light controller 29. The trigger circuit 26 includes a resistor, a trigger capacitor 26a, and a trigger coil 26b.

The boost charging circuit 22 boosts the voltage at a power source 21 and charges the main capacitor 23 and the trigger capacitor 26a in the trigger circuit 26 with the voltage (accumulates electric charge). Also, the boost charging circuit 22 includes a voltage detector 22a. The voltage detector 22a detects the voltage charged in the capacitor 23.

The power source 21 supplies each section of the digital camera 1 with power.

The diode 24 prevents backflow of the electric current, and the capacitor 23 accumulates the electric charge emitted from the xenon tube 27.

The trigger SW 25 is a switch used to start light emission from the xenon tube 27.

The trigger circuit 26 is a circuit used to discharge the electric charge accumulated in the main capacitor 23 and generate the flash from the xenon tube 27. The trigger capacitor 26a of the trigger circuit 26 is charged with voltage. The trigger coil 26b includes a primary coil and a secondary coil. The secondary coil generates voltage that is a boosted voltage at the primary coil, and the voltage generated by the secondary coil is applied to a trigger electrode 27a.

The light emission terminating SW 28 is a switch used to terminate the flash from the xenon tube 27.

The strobe light controller 29 controls the boost charging circuit 22, the trigger SW 25, and the light-emission terminating SW 28 of the xenon strobe light device 15. The strobe light controller 29 sends a charging signal to the boost charging circuit 22, a light emission starting signal to the trigger SW 25, and a light emission terminating signal to the light emission terminating SW 28. Upon receiving the charging signal from the strobe light controller 29, the boost charging circuit 22 boosts the voltage at the power source 21 and charges the main capacitor 23 and the trigger capacitor 26a with the voltage. Upon receiving the light emission starting signal from the strobe light controller 29, the trigger SW 25 is turned ON. Upon receiving the light emission terminating signal from the strobe light controller 29, the light emission terminating SW 28 operates to terminate the flash from the xenon tube.

The voltage detector 22a sends a charged voltage signal indicating a detected charged voltage at the main capacitor 23 to the strobe light controller 29.

The strobe light controller 29 outputs the charging signal, the light emission starting signal, and the light emission terminating signal in adherence to control signals from the CPU 10.

In the xenon strobe light device 15 configured as described above, when the trigger SW 25 is turned ON by the light emission starting signal from the strobe light controller 29 after the main capacitor 23 and the trigger coil 26a are charged, the electric charge in the trigger capacitor 26a passes through the primary coil side of the trigger coil 26b and is discharged. The voltage (trigger voltage) that is further boosted, generated on the secondary coil side of the trigger coil 26b, is applied to the trigger electrode 27a.

When the voltage is applied to the trigger electrode 27a, the applied voltage is transmitted in the xenon tube 27, through a tube wall, and ionizes gas. Then, the interior of the xenon tube 27 becomes conductive. A large amount of electric charge charged in the main capacitor 23 is discharged, and the discharged electric charge flows into the xenon tube 27, thereby, causing the xenon tube 27 to flash.

As described above, the xenon strobe light emits light using gas discharge. Therefore, the xenon strobe light can emit a strong light. However, a high voltage and a high current are required, light emission duration per instance of light emission is short, and light emission amount and light emission duration are difficult to control. Also, because charging and discharging by a large-capacity capacitor is used, certain limits are applied when the light emission interval of consecutive light emission is shortened. Furthermore, because the main capacitor 23 is required to be recharged when the electric charge accumulated in the main capacitor 23 is depleted, the number of consecutive light emissions is limited. The xenon strobe light also has spectral characteristics including several visible wavelengths.

Although the xenon strobe light is used herein, a light emitting tube that uses discharge using another gas can be used. Furthermore, if the light-emitting tube is a light-emitting device of which any of the above-described characteristics differ compared to the LED strobe light described hereafter, the light-emitting device can be used in combination with the LED strobe light or the like to control light emission. Thus, light-emitting device and the LED strobe light or the like can be used to compensate for each others weaknesses.

Figure 3A:
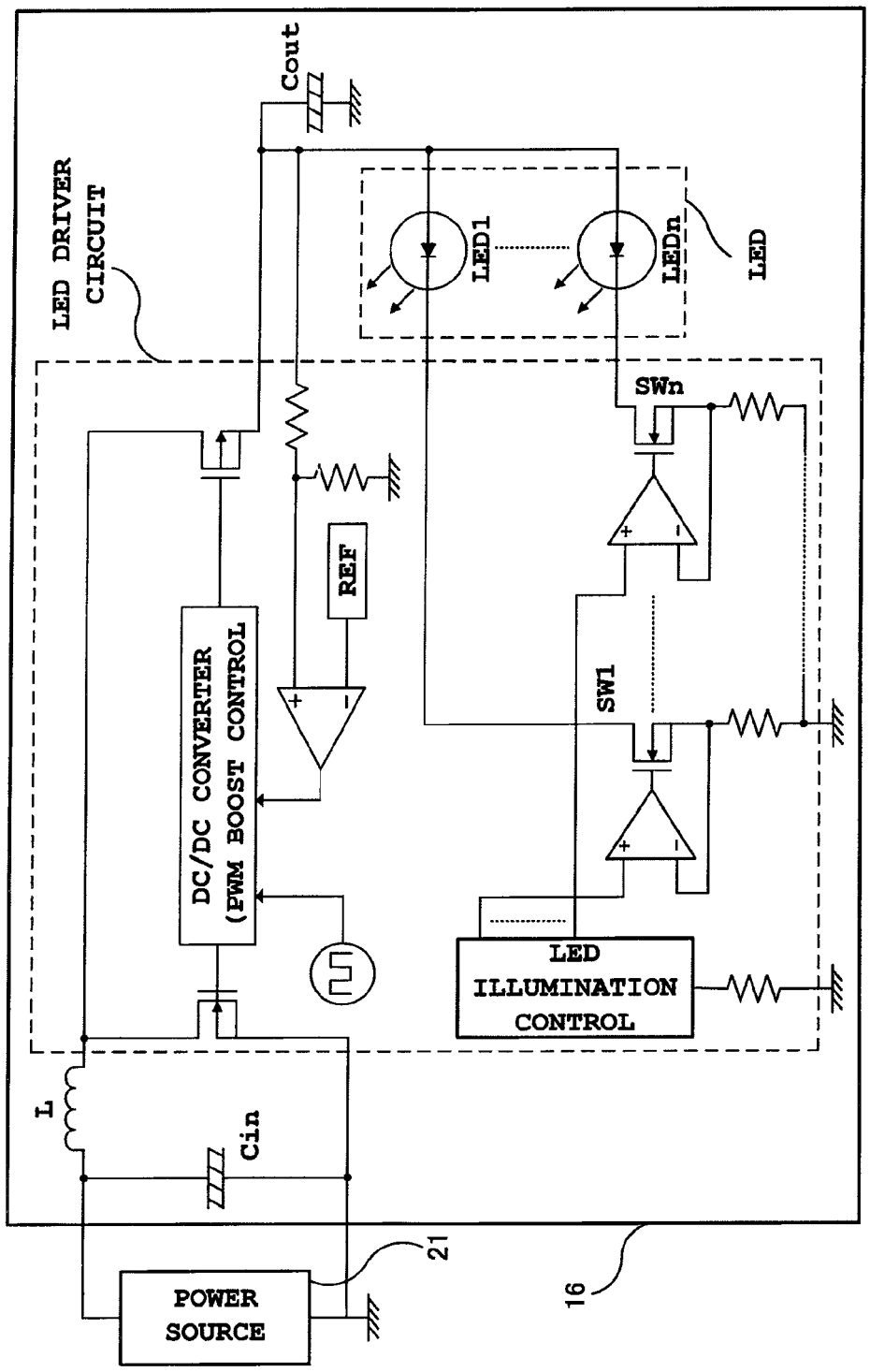
FIG. 3A is a block diagram of an overall configuration of an LED strobe light device 16.
Figure 3B:
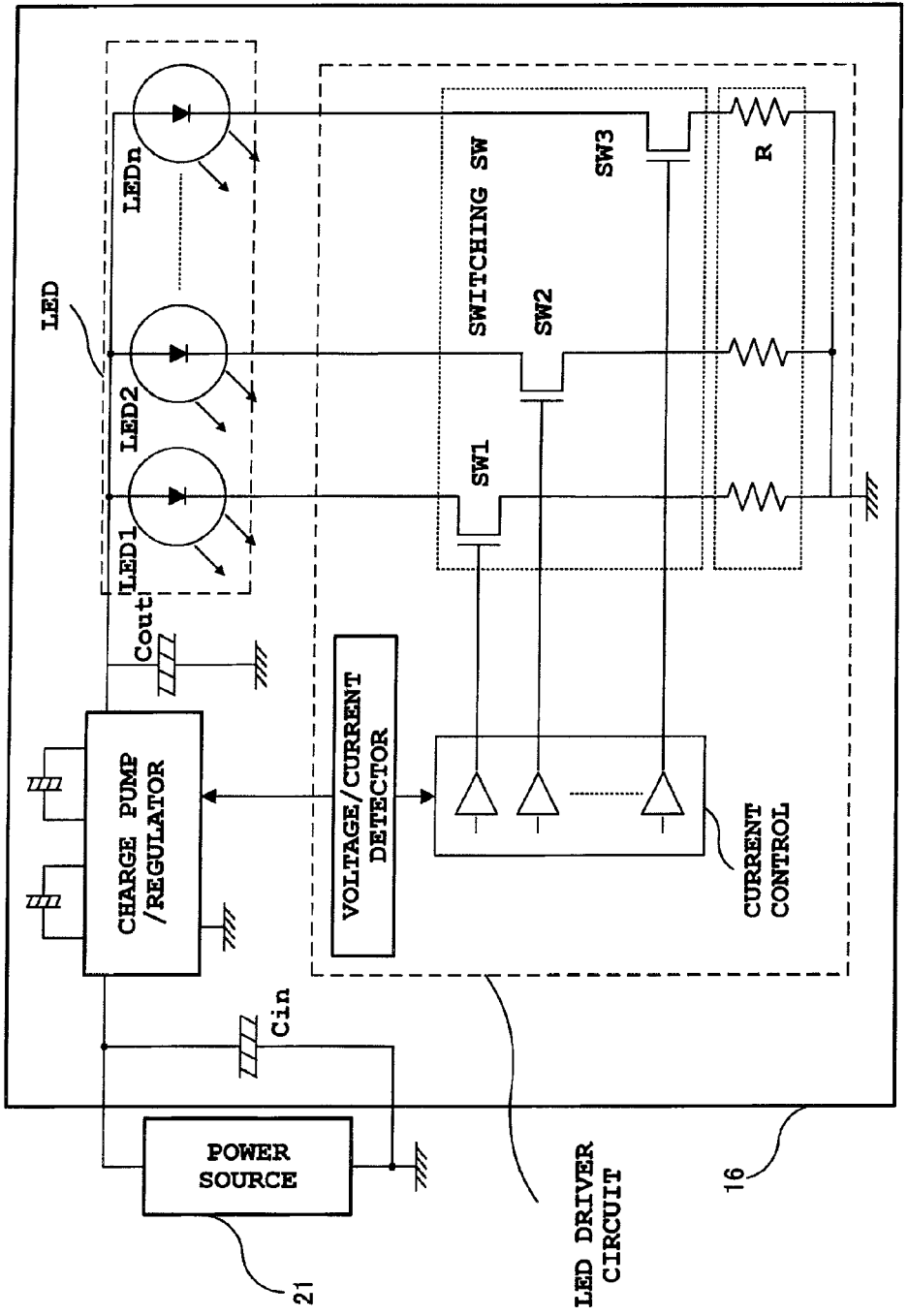
FIG. 3B is a block diagram of an overall configuration of the LED strobe light device 16.

As shown in FIG. 3A and FIG. 3B, the LED strobe light device 16 includes an LED and an LED driver circuit, and the LED driver circuit illuminates the LED by providing the LED with electric current. Therefore, compared to the xenon strobe light, the LED strobe light cannot easily emit a strong light. However, the light can be emitted using low voltage and low current, light emission duration can be extended, and the light emission amount and the light emission duration can be easily controlled. Unlike the xenon strobe light, a large-capacity capacitor is not required to be charged. Therefore, the light emission interval during consecutive light emission can be shortened, and the LED can be illuminated as many times as desired. The LED driver circuit illuminates the LED depending on the light emission controlling signal from the CPU 10. FIG. 3A shows a LED strobe light device that uses a direct current (DC)-to-DC converter performing pulse width modulation (PWM). FIG. 3B shows an LED strobe light device that uses a charge pump or the like.

The light emission amount from the LED can be changed depending on the size of the electric current supplied to the LED and the amount of time over which the electric current is supplied. Also, a plurality of LEDs can be provided, and the light emission amount can be changed by the number of illuminated LEDs being changed. Unlike the xenon strobe light, the LED strobe light by itself has spectral characteristics including a large amount of a certain wavelength component.

The LED is used herein. However, a solid light-emitting element using another electrical component can also be used. Furthermore, if a light-emitting device (solid light-emitting element) of which any of the above-described characteristics differ compared to the Xenon strobe light is used, the light-emitting device can be used in combination with the xenon strobe light or the like to control light emission. Thus, light-emitting device and the LED strobe light or the like can be used to compensate for each others weaknesses.

A-2. Operations of the Digital Camera 1

An operation performed by the digital camera 1 according to the first embodiment will be described with reference to the flowcharts in FIG. 4 to FIG. 9. Here, operations of the digital camera 1 operating in consecutive imaging mode will be described as consecutive imaging. In consecutive imaging mode, the digital camera 1 images the subject a plural number of times at a predetermined imaging interval.

First, when the digital camera 1 is set to consecutive imaging mode by a user's operation of the mode switching key at Step 1, the CPU 10 starts imaging the subject using the CCD 5 and performs image processing, such as generating the luminance and color difference signal from image data acquired through the imaging. Then, the CPU 10 stores the image data of the generated luminance and color difference signal in the buffer memory (DRAM 11) and starts a through-image display in which the image displaying section 12 displays the stored image data of the subject.

Next, at Step S2, the CPU 10 judges whether an operation for setting various strobe light conditions is performed.

At this time, the user can set various strobe light conditions by operating the menu key and the cross-shaped key, and when an operation signal corresponding with the operation for setting the various strobe light conditions is sent from the key inputting section 14, the CPU 10 judges that the various strobe light conditions have been set.

Here, the various strobe light conditions refer to various conditions, such as whether to emit the strobe light and the type of strobe light to be emitted.

The user can set the condition, whether to emit the strobe light, by making a selection from three patterns. The three patterns are "forced strobe light emission", "no strobe light emission", and "automatic strobe light emission". When the user selects "forced strobe light emission", the strobe light is forcibly emitted regardless of imaging conditions. When the user selects "no strobe light emission", the strobe light is not emitted, regardless of the imaging conditions. When the user selects "automatic strobe light emission", whether to emit the strobe light is judged depending on the imaging conditions, and the emission and no-emission of the strobe light is automatically decided.

Also, the user can set the type of strobe light to be emitted by making a selection from three patterns. The three patterns are "xenon strobe light", "LED strobe light", and "automatically-switched strobe light". When the user selects "xenon strobe light", the xenon strobe light is emitted. When the user selects "LED strobe light", the LED strobe light is emitted. When the user selects "automatically-switched strobe light", the strobe light is switched to the LED strobe light and emitted after the xenon strobe light is emitted.

Here, when the xenon strobe light is emitted, because the xenon strobe light is emitted using the voltage (electric charge) charged in the main capacitor 23, the xenon strobe light cannot be emitted any longer when the voltage at the main capacitor 23 drops to a predetermined voltage. Therefore, when the xenon strobe light can be consecutively emitted up to a predetermined number of times (three times, herein) and the set strobe light type is "xenon strobe light", the consecutive imaging is completed when the xenon tube 27 is consecutively illuminated (strobe light imaging is performed) for the predetermined number of times. Also, when the strobe light type is set to "automatically-switched strobe light", the strobe light is switched to the LED strobe light and emitted after the xenon tube 27 is illuminated for the predetermined number of times. The number of times the LED strobe light can be emitted is not limited, and so when the LED strobe light is selected, consecutive imaging can be performed regardless of the number of times the strobe light is emitted. In other words, when strobe light type is set to "LED strobe light" and "automatically-switched strobe light", the consecutive imaging can be performed as many times as desired until a shutter button that is being pressed is released. Also, when the strobe light type is set to "xenon strobe light", only for a maximum of the predetermined number of times, the consecutive imaging can be performed until the shutter button that is being pressed is released. When the CPU 10 judges at Step S2 that the operation for setting the strobe light conditions has been performed, the CPU 10 proceeds to Step S3, and sets the various strobe light conditions based on the user operation (setting section). Then, the set strobe light conditions are stored in a strobe light conditions storage area of the memory 9. When the strobe light conditions are already stored, the stored strobe light conditions are overwritten and the new strobe light conditions are stored. The strobe light conditions storage area includes two storage areas. One storage area (referred to, hereinafter, as storage area A) stores information related to the emission and no-emission of the strobe light ("forced strobe light emission", "no strobe light emission", and "automatic strobe light emission"). The other storage area (referred to, hereinafter, as storage area B) stores the strobe light type ("xenon strobe light", "LED strobe light", and "automatically-switched strobe light").

The stored strobe light conditions are stored until the operation for setting the strobe light conditions is performed again. For example, the strobe light conditions set for a previous instance of consecutive imaging is held unless the operation for setting the strobe light conditions is performed. When the operation for setting the strobe light conditions is not performed, a current instance of consecutive imaging is performed under the strobe light conditions of the previous instance of consecutive imaging.

At the same time, when the CPU 10 judges at Step S2 that the operation for setting the strobe light conditions is not performed, the CPU 10 proceeds directly to Step S4.

Next, at Step S4, the CPU 10 judges whether the emission of strobe light is currently set to "no strobe light emission". In other words, the CPU 10 judges whether "no strobe light emission" is stored in the storage area A of the strobe light conditions storage area.

When the CPU 10 judges that the emission of strobe light is not currently set to "no strobe light emission", or in other words, judges that the emission of strobe light is set to "forced strobe light emission" or "automatic strobe light emission", the CPU 10 proceeds to Step S5, and judges whether the type of strobe light to be emitted is set to "LED strobe light". In other words, the CPU 10 judges whether "LED strobe light" is stored in the storage area B of the strobe light conditions storage area.

When the CPU 10 judges at Step S5 that the strobe light type is not set to "LED strobe light", or in other words, judges that the strobe light type is "xenon strobe light" or "automatically-switched strobe light", the xenon strobe light will be emitted or may possibly be emitted. Therefore, the CPU 10 proceeds to Step S6 and sends a control signal to the xenon strobe light device 15. As a result, charging of the main capacitor 23 of the xenon strobe light device 15 starts. At this time, the trigger capacitor 26a is also charged.

Next, at Step S7, the CPU 10 judges whether the charging is completed. The CPU 10 makes the judgment based on whether the charged voltage detected by the voltage detector 22a in the xenon strobe light device 15 has reached a constant voltage (voltage when the electric charges accumulated in the main capacitor 23 are full). At this time, the strobe light controller 29 in the xenon strobe light device 15 outputs the detected voltage signal sent from the voltage detector 22a to the CPU 10.

Figure 10A:
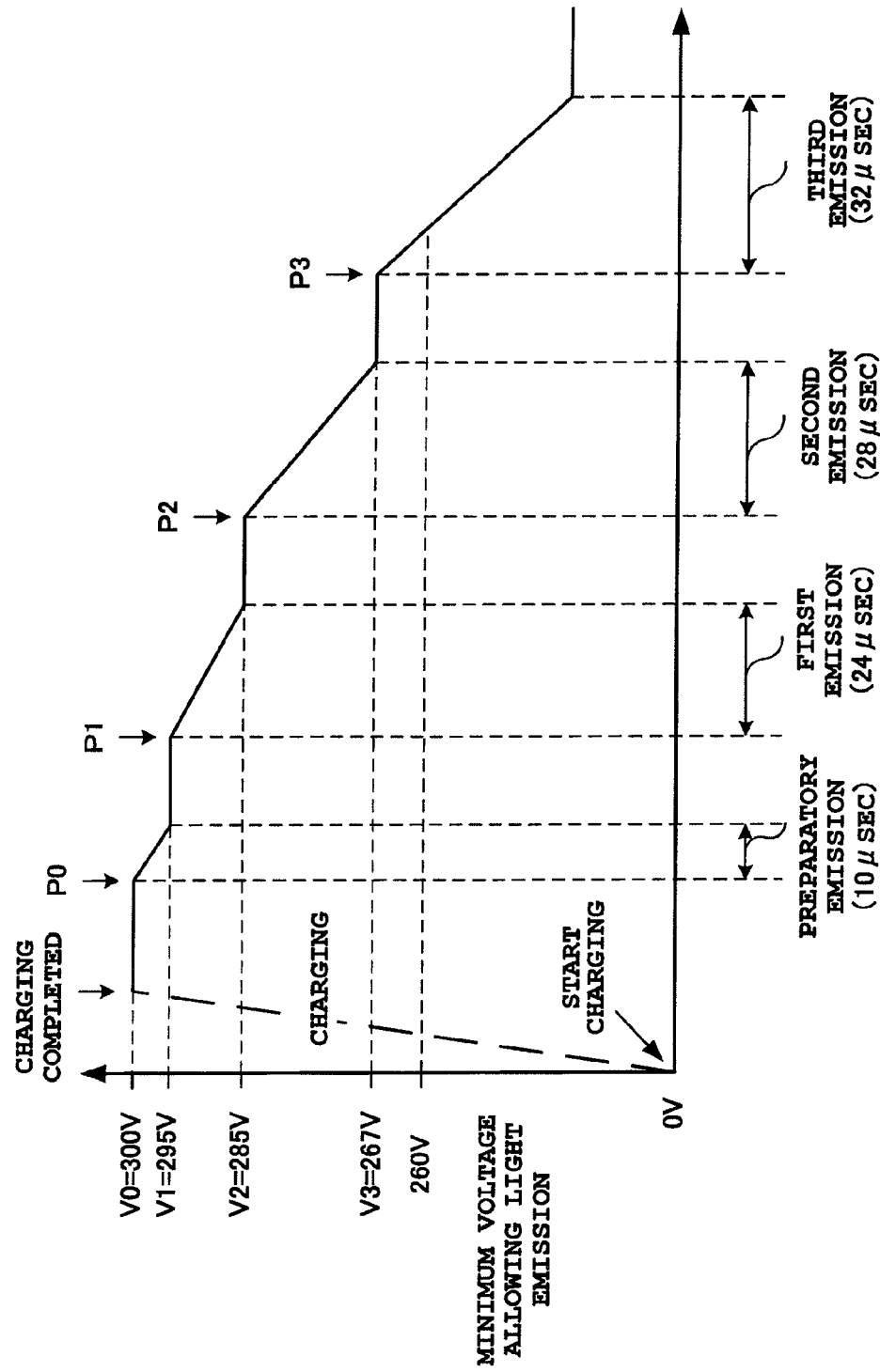
FIG. 10A is a time chart of voltages in a main capacitor 23.

It is clear from FIG. 10A that the voltage at the main capacitor 23 rises with the start of charging. It is also clear from FIG. 10A that the charging is completed when the voltage at the main capacitor 23 reaches the constant voltage (300 volts, herein), and the voltage does not rise any further. FIG. 10B shows a time chart of the voltages at the main capacitor 23.

When the CPU 10 judges at Step S7 that the charging is not completed, the CPU 10 remains at Step S7 until the charging is judged to have been completed. When the charging is judged to have been completed, the CPU 10 proceeds to Step S8.

At the same time, when the CPU 10 judges at Step S4 that the emission of strobe light is set to "no strobe light emission" and judges at Step S5 that the strobe light type is "LED strobe light", the CPU 10 proceeds directly to Step S8. This is because the xenon strobe light is not required to be emitted, and so the main capacitor 23 is not required to be charged.

At Step S8, the CPU 10 judges whether the shutter button is depressed. The CPU 10 makes the judgment based on whether an operation signal corresponding to a depression operation of the shutter button is sent from the key inputting section 14.

When the CPU 10 judges at Step S8 that the shutter button is not depressed, the CPU 10 returns to Step S2 until the shutter button is depressed. When the CPU 10 judges that the shutter button is depressed, the CPU 10 proceeds to Step S9. At Step S9, the CPU 10 calculates an optimal exposure amount EV value for the consecutive imaging. This optimal exposure amount EV value is calculated based on a luminance component of a most recently picked up image data.

Next, at Step S10, the CPU 10 calculates exposure conditions (aperture value, exposure duration, and sensitivity) based on the calculated optimal exposure amount EV value and sets the exposure conditions. The set exposure conditions are stored in an exposure conditions storage area of the buffer memory. The exposure conditions to be set vary depending on the consecutive imaging speed of the consecutive imaging. For example, when the consecutive imaging speed is high, the number of times imaging is performed per unit of time increases. Therefore, the range of exposure duration that can be set is shortened in adherence to the increase. For example, when 30 frames are taken per second, compared to when ten frames are taken per second, the consecutive imaging speed increases, and the range of exposure duration that can be set is shortened.

The consecutive imaging speed can be arbitrarily changed by the user. The consecutive imaging speed can also be automatically set depending on the set strobe light type. When the user changes the setting of the consecutive imaging speed, a limit based on the set strobe light type can be applied to the consecutive imaging speed that can be set. This is because, for example, when the xenon strobe light is selected, compared to when the LED strobe light is selected, there is a limit to how short the light emission interval can be, and the light emission interval and the light emission duration increase.

The exposure conditions are set to achieve the calculated optimal exposure amount EV value. However, when the subject is dark or the like, setting the exposure conditions to achieve the optimal exposure amount EV value may not be possible. For example, the optimal exposure amount EV value may not be achieved even when the exposure duration is set to the maximum duration within the range that can be set, the aperture is opened, and the sensitivity is increased, because the subject is too dark. Although the sensitivity can be increased by an increase in a gain value of the AGC circuit in the unit circuit 8, image quality deteriorates when the gain value is excessively increased. Therefore, the range of sensitivity that can be set also has certain limits.

Next, at Step S11, the CPU 10 judges whether the emission of strobe light is currently set to "no strobe light emission".

When the CPU 10 judges at Step S11 that the emission of strobe light is not currently set to "no strobe light emission", the CPU 10 proceeds to Step S12 and judges whether the emission of strobe light is currently set to "automatic strobe light emission".

When the CPU 10 judges at Step S12 that the emission of strobe light is currently set to "automatic strobe light emission", the CPU 10 proceeds to Step S13 and judges whether the strobe light is to be emitted. This judgment is made based on whether the optimal exposure amount EV value calculated at Step S9 is achieved, based on the aperture value, the exposure duration, and the sensitivity set at Step S10. When the optimal exposure amount EV value is not achieved, the CPU 10 judges that the strobe light is to be emitted.

Figure 5:
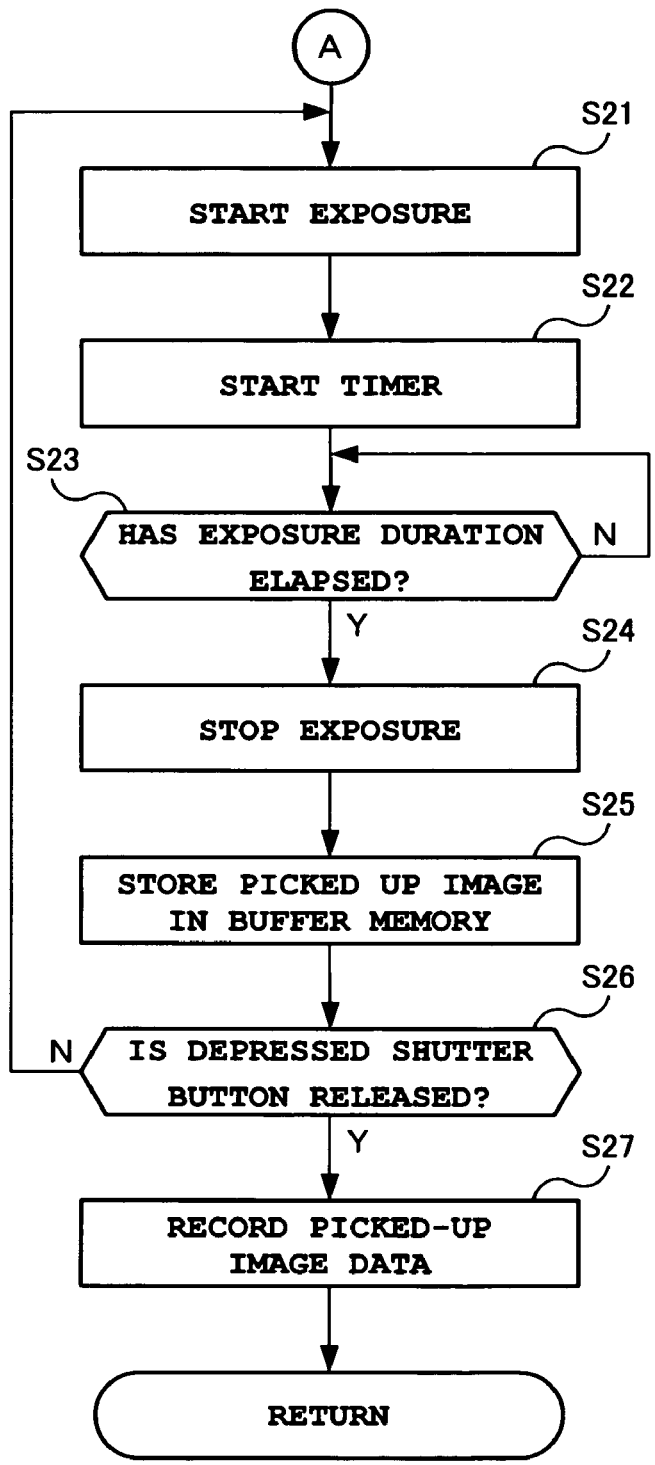
FIG. 5 is a flowchart of operations performed by the digital camera 1 according to the first embodiment.

When the CPU 10 judges at Step S11 that the emission of strobe light is currently set to "no strobe light emission" or when the CPU 10 judges at Step S13 that the strobe light is not to be emitted, the CPU 10 proceeds to Step S21 in FIG. 5 and performs consecutive imaging without emitting the strobe light. This operation will be described hereafter.

When the CPU 10 judges at Step S12 that the emission of strobe light is not currently set to "automatic strobe light emission", or in other words, judges that the emission of strobe light is currently set to "forced strobe light emission", or when the CPU 10 judges at Step S13 that the strobe light is to be emitted, the CPU 10 proceeds to Step S14. Then, the CPU 10 judges whether the strobe light type is set to "xenon strobe light". In other words, the CPU 10 judges whether "xenon strobe light" is stored in the storage area B of the strobe light conditions storage area.

Figure 6:
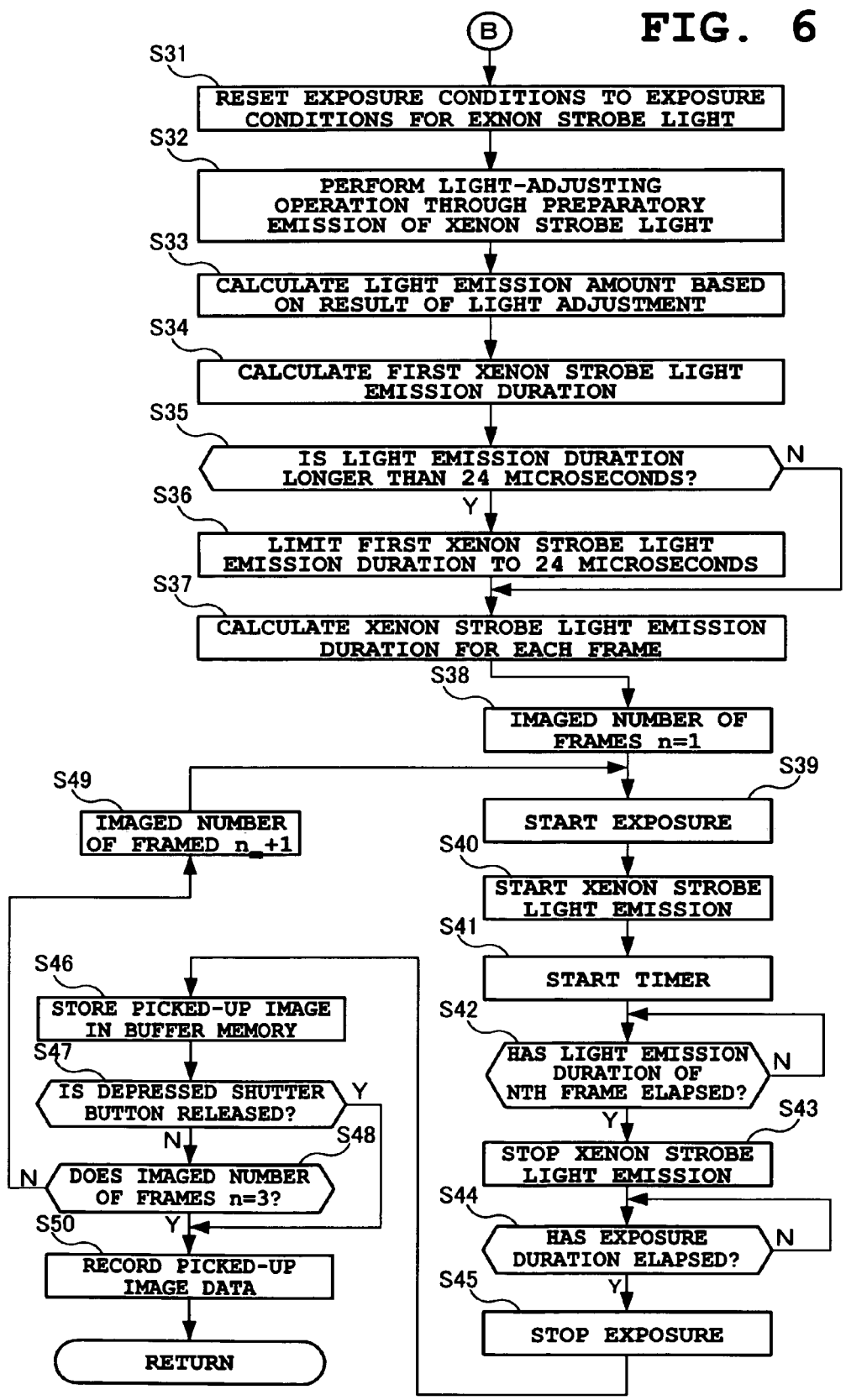
FIG. 6 is a flowchart of operations performed by the digital camera 1 according to the first embodiment.

When the CPU 10 judges at Step S14 that the strobe light type is currently set to "xenon strobe light", the CPU 10 proceeds to Step S31 in FIG. 6, and performs consecutive imaging in which the xenon strobe light is emitted. This operation will be described hereafter.

At the same time, when the CPU 10 judges at Step S14 that the strobe light type is not currently set to "xenon strobe light", the CPU 10 proceeds to Step S15, and judges whether the strobe light type is currently set to "LED strobe light". In other words, the CPU 10 judges whether "LED strobe light" is stored in the storage area B.

Figure 7:
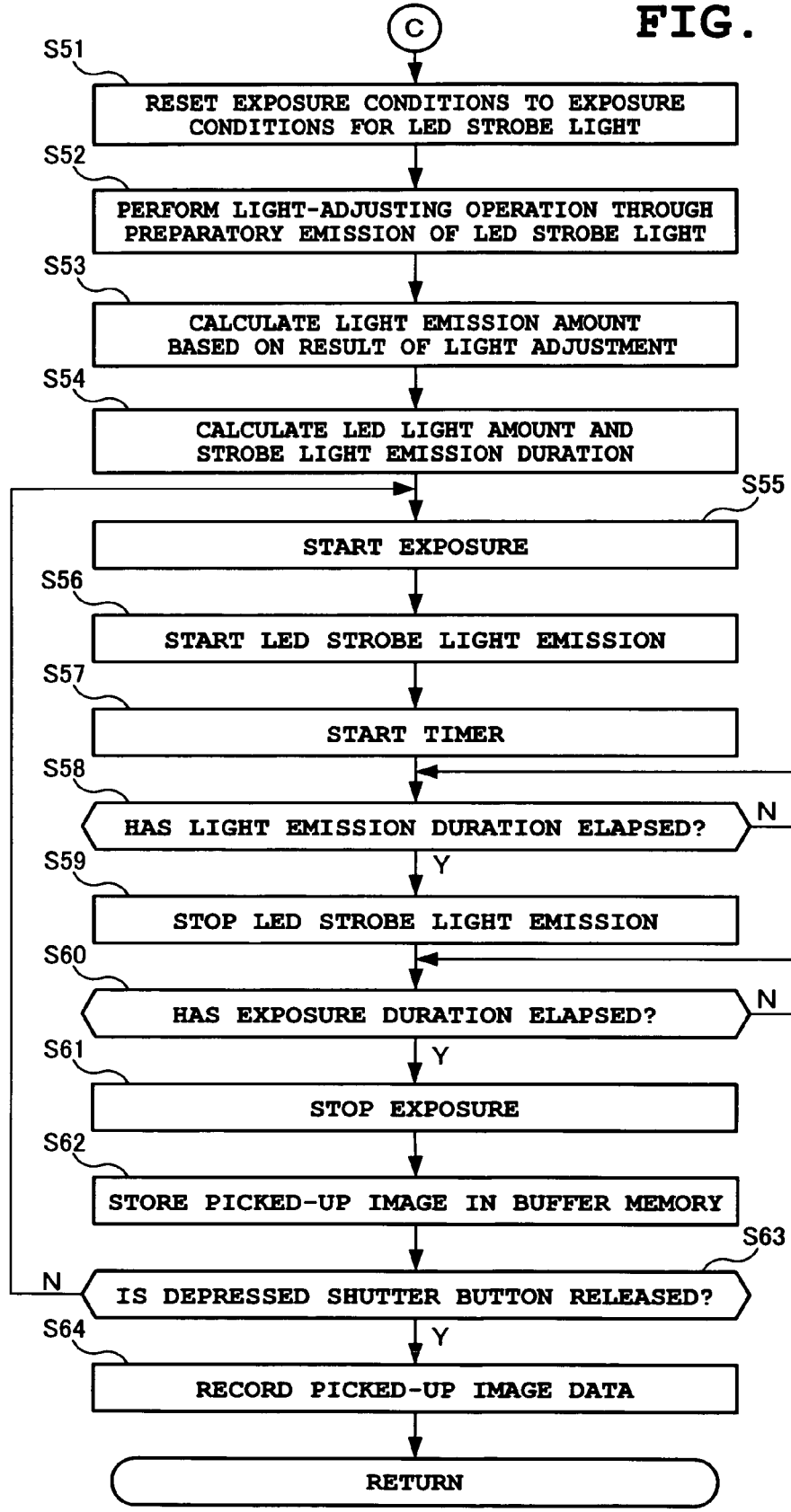
FIG. 7 is a flowchart of operations performed by the digital camera 1 according to the first embodiment.

When the CPU 10 judges at Step S15 that the strobe light type is currently set to "LED strobe light", the CPU 10 proceeds to Step S51 in FIG. 7, and performs consecutive imaging in which the LED strobe light is emitted. This operation will be described hereafter.

Figure 8:
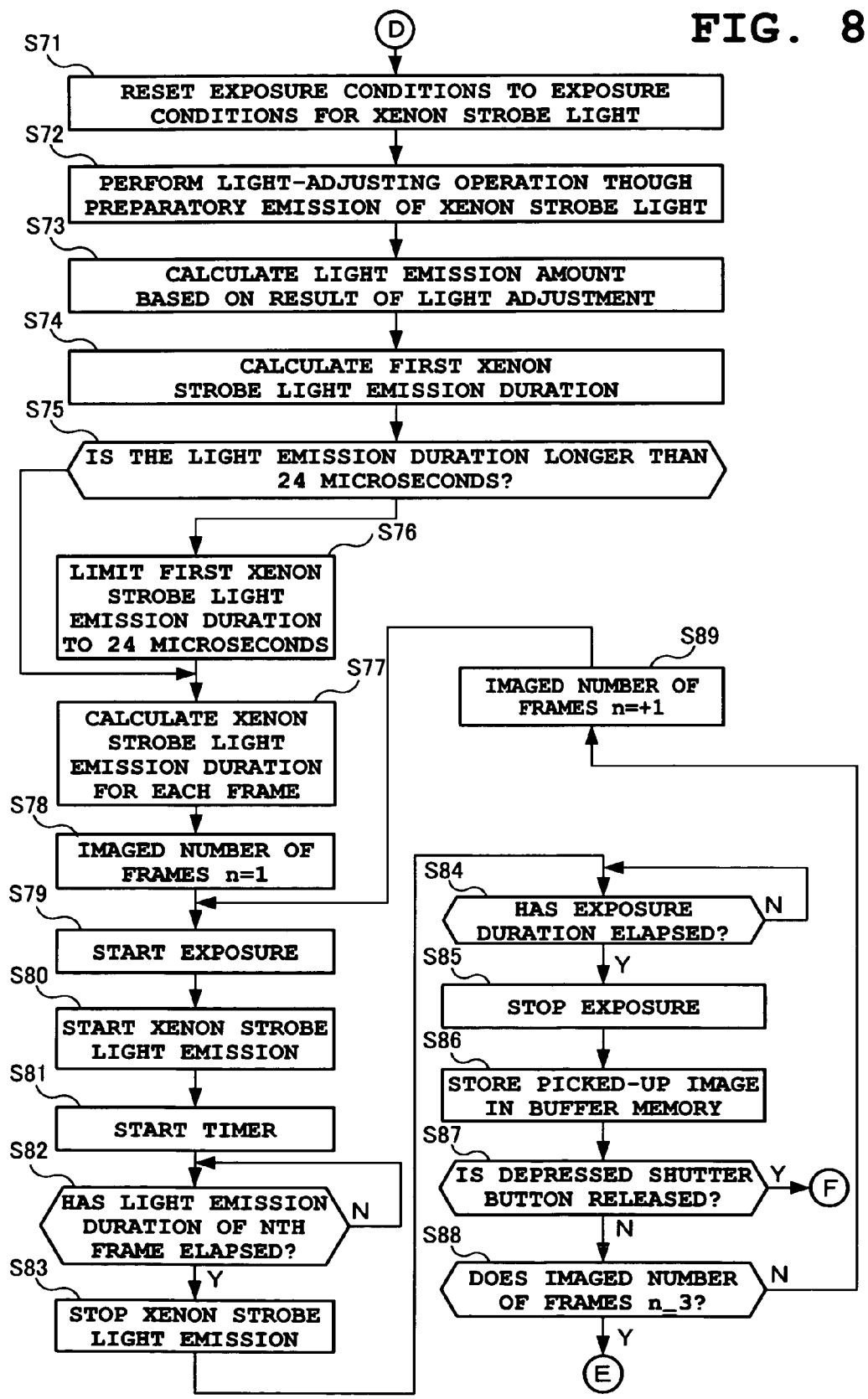
FIG. 8 is a flowchart of operations performed by the digital camera 1 according to the first embodiment.

At the same time, when the CPU 10 judges at Step S15 that the strobe light type is not currently set to "LED strobe light", or in other words, judges that the strobe light type is currently set to "automatically-switched strobe light" (stored in the storage area B), the CPU 10 proceeds to Step S71 in FIG. 8. At Step S71, the CPU 10 performs consecutive imaging in which, after the xenon strobe light is emitted, the strobe light is switched to the LED strobe light and the LED strobe light is emitted. This operation will be described hereafter.

When the CPU 10 judges at Step S11 that the emission of strobe light is currently set to "no strobe light emission" or when the CPU 10 judges at Step S13 that the strobe light is not to be emitted, the CPU 10 proceeds to Step S21 in FIG. 5, and performs normal consecutive imaging (consecutive imaging in which the strobe light is not emitted) (consecutive imaging controlling section). Here, consecutive imaging refers, as described above, to imaging the subject a plurality of times at a predetermined imaging interval. In other words, an operation in which exposure is performed and image data acquired through the exposure is read out is repeatedly performed.

The normal consecutive imaging (consecutive imaging in which the strobe light is not emitted) will be described in detail. The normal consecutive imaging is still-image imaging performed consecutively. First, at Step S21, the CPU 10 starts exposure. At this time, exposure starts after the electric charge accumulated in the CCD 5 is discharged.

Next, at Step S22, the CPU 10 starts the timer.

Next, at Step S23, the CPU 10 judges whether the exposure duration has elapsed. The exposure duration is set at Step S10 in FIG. 4.

When the CPU 10 judges at Step S23 that the exposure duration has not elapsed, the CPU 10 remains at Step S23 until the exposure duration is judged to have elapsed. When judged to have elapsed, The CPU 10 stops the exposure by closing the combination aperture and shutter 4.

The exposure is performed using the combination aperture and shutter 4. However, the exposure can be performed using the electronic shutter as well.

Next, the CPU 10 proceeds to Step S25 and reads out the electric charges accumulated in the CCD 5 (the picked-up image data acquired through still-image imaging) via the driver 6 and the TG 7. The CPU 10 then stores the electric charges in the buffer memory. At this time, the CPU 10 performs image processing on the picked-up image data, and the picked-up image data to which image processing has been performed is stored in the buffer memory.

Next, the CPU 10 proceeds to Step S26, and judges whether the shutter button that is being depressed is released. This judgment is made based on whether the key inputting section 14 has stopped sending the operation signal corresponding with the depression of the shutter button.

When the CPU 10 judges at Step S26 that the shutter button that is being depressed has not been released, the CPU 10 returns to Step S21 and repeats the operations described above. As a result, the subject is consecutively imaged, and the pieces of image data that are being picked up are stored in the buffer memory.

At the same time, when the CPU 10 judges at Step S26 that the shutter button that is being depressed has been released, the CPU 10 proceeds to Step S27, and compresses each of the one or more pieces of picked-up image data stored in the buffer memory.

Figure 4:
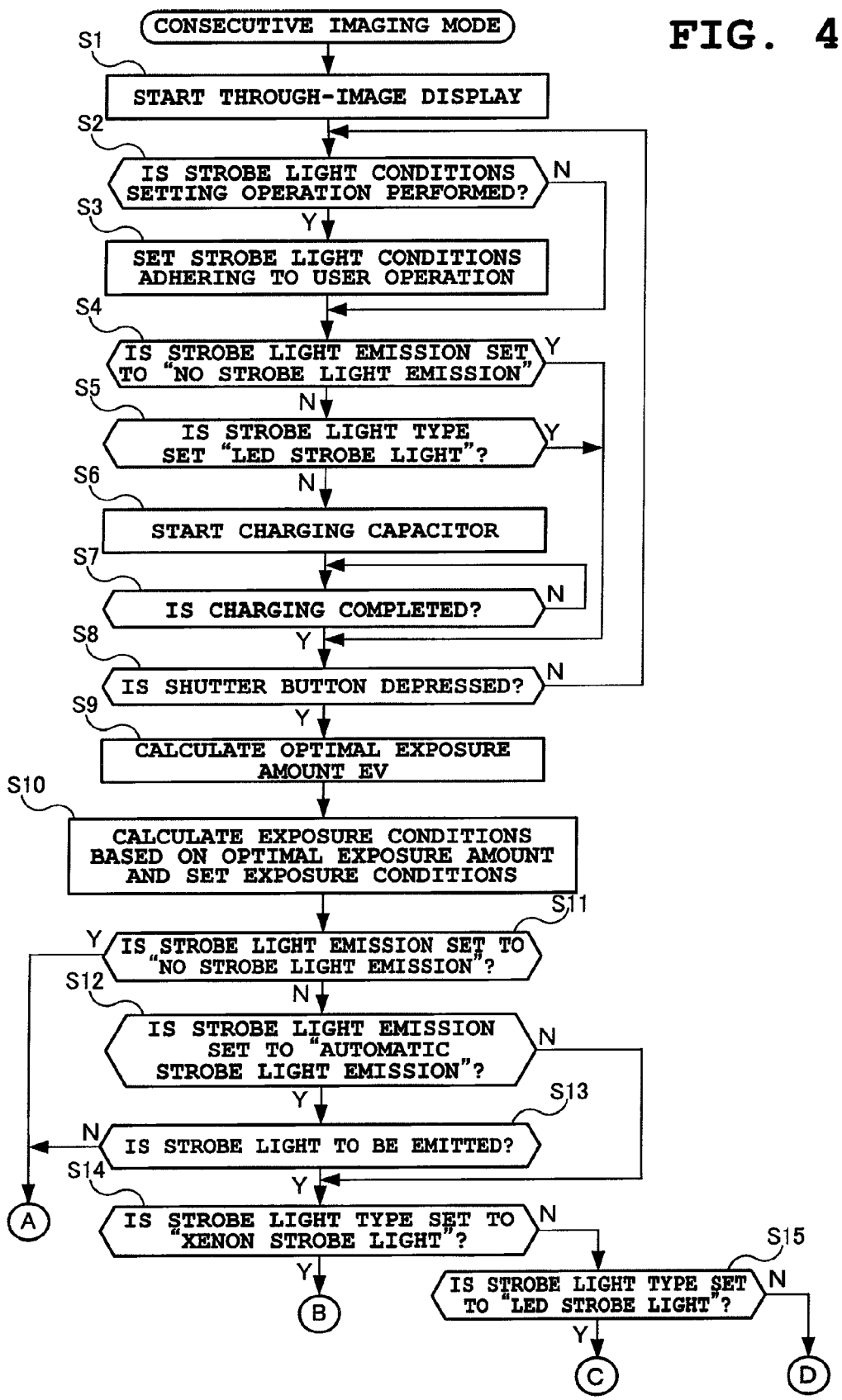
FIG. 4 is a flowchart of operations performed by the digital camera 1 according to the first embodiment.

When the CPU 10 judges at Step S14 in FIG. 4 that the strobe light type is currently set to "xenon strobe light", the CPU 10 proceeds to Step S31 in FIG. 6, and resets the exposure conditions (the aperture value, the exposure duration, and the sensitivity) for the xenon strobe light based on the exposure conditions set at Step S10 in FIG. 4. The exposure conditions in the exposure conditions storage area of the buffer memory are overwritten with the reset exposure conditions, and the reset exposure conditions are stored.

Next, at Step S32, the CPU 10 performs a light-adjusting operation through a preparatory emission of the xenon strobe light. In other words, the CPU 10 performs a preparatory illumination of the xenon tube 27 by sending a control signal to the xenon strobe light device 15. At the same time, after the CPU 10 makes the CCD 5 perform the imaging (electric charge accumulation) operation, the CPU 10 performs a process to read out the electric charges accumulated in the CCD 5. At this time, because the preparatory emission is performed, the light emission duration is shorter than that during strobe light imaging. Here, the light emission duration of the preparatory emission is 10 microseconds. The voltage drop at the main capacitor 23 increases with the length of the light emission duration. Therefore, the light emission duration is made shorter than that during strobe light imaging to keep the voltage drop at the main capacitor 23 to a minimum during the preparatory emission.

It is clear through FIG. 10A and FIG. 10B that, during the preparatory emission, the CPU 10 sends the control signal for emitting the strobe light to the xenon strobe light device 15. The xenon strobe light device 15 discharges the electric charges in the main capacitor 23 and emits (flashes) light from the xenon tube 27. Therefore, the voltage at the main capacitor 23 drops from 300 volts to 295 volts.

Next, at Step S33, the CPU 10 calculates the amount of light emission from the xenon tube 27 based on the result of the light-adjusting operation (xenon light emission amount calculating section). As a result, an adequate amount of light emission from the xenon tube 27 can be calculated.

The light emission amount is calculated such that the optimal exposure amount can be achieved based on a mean value of luminance of the read image data (or some pieces of the image data).

Next, at Step S34, the CPU 10 calculates the duration of a first light emission from the xenon tube 27 (first frame) such that the calculated light emission amount is achieved. This calculated first light emission duration is stored in the light emission duration storage area of the buffer memory.

Next, at Step S35, the CPU 10 judges whether the calculated first light emission duration of the xenon tube 27 is longer than a fixed duration (24 microseconds, herein). A reason for judging whether the light emission duration is longer than 24 microseconds will be explained hereafter. However, simply stated, if the first light emission duration of the xenon tube 27 is longer than 24 microseconds, the xenon tube 27 cannot be illuminated three consecutive times.

When the CPU 10 judges at Step S35 that the first light emission duration of the xenon tube 27 is longer than 24 microseconds, the CPU 10 proceeds to Step S36 and forcibly limits the first light emission duration of the xenon strobe light to 24 microseconds. Then, the CPU 10 proceeds to Step S37. At this time, the first light emission duration stored in the light emission duration storage area is overwritten with the light emission duration of 24 microseconds, and the light emission duration of 24 microseconds is stored. As a result, the first light emission duration calculated at Step S34 is deleted. Thus, the xenon tube 27 can be illuminated for the predetermined number of times (three times, herein).

At the same time, when the CPU 10 judges at Step S35 that the first light emission duration of the xenon tube 27 is not longer than 24 microseconds, the CPU 10 proceeds directly to Step S37.

At Step S37, the CPU 10 calculates a second light emission duration (second frame) and a third light emission duration (third frame). The light emission durations of each frame is calculated because the voltage at the main capacitor 23 drops every time the strobe light is emitted. To emit light three consecutive times with the same light emission amount, the light emission duration is required to be lengthened based on the number of light emissions.

A method of calculating the light emission duration of each number of frames is as follows. The second light emission duration and the third light emission duration of the xenon tube 27 can be calculated using the first light emission duration of the xenon strobe light calculated at Step S34 (24 microseconds when the limit is applied at Step S36), namely the first light emission duration stored in the light emission duration storage section, and a correction coefficient table such as that shown in FIG. 10B. The second and third light emission durations t equals correction coefficient multiplied by first light emission duration. The second light emission duration and the third light emission duration differ depending on the correction coefficients. However, it goes without saying that the correction coefficients are set such that the light emission amounts are the same.

It is clear from FIG. 10B that the correction coefficient of the second light emission duration is 1.18. Therefore, the second light emission duration is 1.18 multiplied by the first light emission duration, and the correction coefficient of the third light emission duration is 1.36. Thus, the third light emission duration is 1.36 multiplied by the first light emission duration.

The second light emission duration and the third light emission duration are calculated in this way. The calculated second light emission duration and third light emission duration are stored in the light emission duration storage area of the buffer memory.

Next, the reason why the xenon strobe light cannot be emitted three consecutive times when the first light emission duration is longer than 24 microseconds will be explained.

First, in FIG. 10A, a minimum voltage at which the light emission can be performed is 260 volts. This minimum voltage is a minimum required voltage (threshold voltage) for performing the third light emission. In other words, when the voltage at the main capacitor 23 is lower than the threshold voltage, the xenon tube 27 cannot be illuminated.

Therefore, if the first light emission duration is known, the second light emission duration is also known. Thus, voltage at the main capacitor 23 after the completion of the second light emission can also be known.

For example, when the first light emission duration is 28 microseconds, the second light emission duration is about 33 microseconds, and the voltage at the main capacitor 23 when the third strobe light emission is performed (after the completion of the second strobe light emission) is 256 volts. Therefore, the third strobe light emission cannot be performed. When the first light emission duration is 24 microseconds, the second light emission duration is about 28 microseconds, and the voltage at the main capacitor 23 when the third strobe light emission is performed is 267 volts. Therefore, the third strobe light emission can be performed.

Thus, when the first light emission duration is longer than 24 microseconds, the CPU 10 judges that the strobe light cannot be emitted three consecutive times. When the first light emission duration is longer than 24 microseconds, the CPU 10 limits the first light emission duration to 24 microseconds. As a result, the xenon tube 27 can be illuminated for the predetermined number of times (three times, herein) without the main capacitor 23 being recharged, and the strobe light imaging can be performed for the predetermined number of times.

Here, whether the first light emission duration is longer than 24 seconds is judged. However, if the voltage at the main capacitor 23 is 260 volts or more when the third strobe light emission is performed, the judgment can be made based on a duration longer or shorter than 24 microseconds, without being restricted to 24 microseconds. Also, here, the strobe light emission is performed three times. However, the strobe light can be emitted twice or four or more times. In this case, the first light emission duration upon which the judgment is based is determined based on the number of times the strobe light is emitted.

Each light emission duration for the consecutive imaging using the xenon strobe light is shorter than the exposure duration in the exposure conditions set at Step S31.

Returning to the flowchart in FIG. 6, at Step S38, the CPU 10 sets a number of imaged frames n to 1 (n=1), and n=1 is stored in an imaged frame count storage area of the buffer memory.

Then, the CPU 10 performs the consecutive imaging using the xenon strobe light. In other words, the CPU 10 controls the xenon strobe light device 15 such that the light is emitted during each instance of imaging of the consecutive imaging (light emission controlling section), and performs the consecutive imaging (consecutive imaging controlling section).

In other words, the CPU 10 consecutively performs the xenon strobe light imaging in which still-image imaging is performed while the xenon tube 27 is illuminated. First, at Step S39, the CPU 10 starts exposure. At this time, the exposure is started after the electric charges accumulated in the CCD 5 are discharged.

Next, at Step S40, the CPU 10 sends the control signal to the xenon strobe light device 15, and the xenon strobe light device 25 starts illuminating the xenon tube 27.

Next, at Step S41, the CPU 10 starts the timer.

Next, at Step S42, the CPU 10 judges whether the light emission duration for an n-th frame has elapsed. In other words, the CPU 10 judges whether the light emission duration, among the light emission durations stored in the light emission duration storage area, corresponding to the n-th frame stored in the imaged frame count storage area has elapsed.

When the CPU 10 judges at Step S42 that the light emission duration has not elapsed, the CPU 10 remains at Step S42 until the light emission duration is judged to have elapsed. When the light emission duration is judged to have elapsed, the CPU 10 proceeds to Step S43. The CPU 10 sends the control signal to the xenon strobe light device 15, and the xenon strobe light device 15 stops emitting the xenon strobe light. As a result, the xenon tube 27 can be illuminated with an adequate amount of light. In other words, when the light emission duration is forcibly limited to 24 microseconds at Step S36, the strobe light can be emitted with a light emission amount allowing the strobe light to be emitted for the predetermined number of times. When the light emission duration is not limited to 24 microseconds at Step S36, the strobe light can be emitted with a light emission amount allowing adequate exposure amount.

Next, at Step S44, the CPU 10 judges whether the exposure duration has elapsed. The exposure duration is what is set at Step S31. In other words, the exposure duration is what is stored in the exposure conditions storage area.

When the CPU 10 judges at Step S44 that the exposure duration has not elapsed, the CPU 10 remains at Step S44 until the exposure duration is judged to have elapsed. When the exposure duration is judged to have elapsed, the CPU 10 proceeds to Step S45, and stops the exposure by closing the combination aperture and shutter 4.

The exposure is performed using the combination aperture and shutter 4. However, the exposure can be performed using the electronic shutter as well.

Next, the CPU 10 proceeds to Step S46. The CPU 10 reads out the electric charges accumulated in the CCD 5 (the picked-up image data acquired through still-image imaging using the xenon strobe light) via the driver 6 and the TG 7, and then stores the electric charges in the buffer memory. At this time, the CPU 10 performs image processing on the picked-up image data, and the picked-up image data to which image processing has been performed is stored in the buffer memory.

Next, the CPU 10 proceeds to Step S47, and judges whether the shutter button that is being depressed is released.

When the CPU 10 judges at Step S47 that the shutter button that is being depressed has not been released, the CPU 10 proceeds to Step S48, and judges whether the number of imaged frames n equals 3 (n=3). In other words, the CPU 10 judges whether the imaging has been performed three consecutive times (frames). This judgment is made based on whether n stored in the imaged frame count storage area is 3.

When the CPU 10 judges at Step S48 that the number of imaged frames n does not equal 3, the CPU 10 proceeds to Step S49 and increments the number of imaged frames n. In other words, the CPU 10 adds 1 to n stored in the imaged frame count storage area. The CPU 10 then returns to Step S39.

Figure 11:
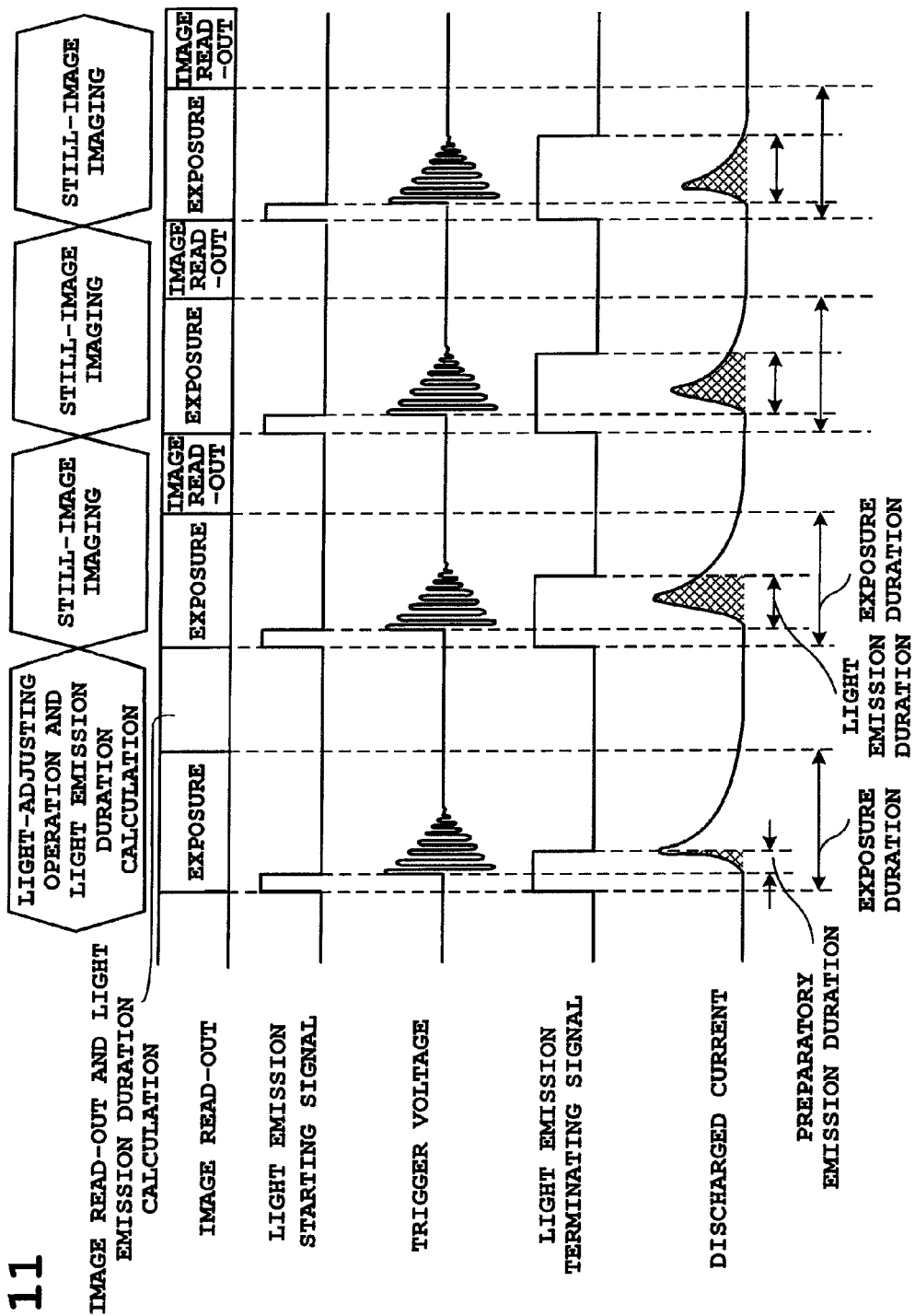
FIG. 11 is a time chart of consecutive imaging using a xenon strobe light.

Here, FIG. 11 is a time chart of the consecutive imaging using the xenon strobe light. In other words, FIG. 11 is a time chart of the exposure, the image read-out, the light emission starting signal sent from the strobe light controller 29, the trigger voltage, the light emission terminating signal sent from the strobe light controller 29, and the electric current discharged to the xenon tube 27.

In FIG. 11, after the light-adjusting operation and the calculation of the light emission duration are performed, the still-image imaging is consecutively performed three times. In other words, FIG. 11 is a time chart of when the still-image imaging is performed three consecutive times without the depressed shutter button being released.

In FIG. 11, when the light-adjusting operation and the exposure for each instance of still-image imaging start, the trigger voltage is generated by the light emission starting signal sent from the strobe light controller 29. Then, the electric current from the main capacitor 27 is discharged to the xenon tube 27 using the generated trigger voltage, and the discharged electric current flows into the xenon tube 27, thereby, illuminating the xenon tube 27.

The discharged electric current in FIG. 11 is indicated by a waved line showing that the discharged electric current increases with the generation of the trigger voltage and disappears after the elapse of a fixed duration. Because the discharged electric current and the light emission are terminated by the light emission terminating signal, a discharged electric current amount and the light emission duration are indicated in FIG. 11 by the shaded sections. Here, the trigger voltage and the discharged electric current are generated at the falling edge of the light emission starting signal, and the discharged electric current and the light emission are terminated at the falling edge of the light emission terminating signal.

It is clear from FIG. 11 that the discharged electric current is generated for each instance of imaging. In other words, the xenon tube 27 is illuminated for every instance of imaging. At this time, the light emission duration of the preparatory light emission for a preparatory operation is shorter than that of the still-image imaging. It is also clear that a peak value of the discharged voltage decreases depending on the number of light emissions. This is because the electric charges accumulated in the main capacitor 23 decreases every time discharge is performed. It is also clear that the light emission duration is within the range of the exposure duration. This is because the amount of light entering the CCD 5 cannot be increased unless the xenon tube 27 is illuminated during exposure.

At the same time, when the CPU 10 judges at Step S47 that the shutter button that is being depressed has been released, or when the CPU 10 judges at Step S48 that the number of imaged frames n=3, the CPU 10 proceeds to Step S50, and compresses the one or more pieces of picked image data stored in the buffer memory and records the compressed image data.

When "xenon strobe light" is set as the strobe light condition as described above and the shutter button that is being depressed is released before imaging is performed three consecutive times, the strobe light consecutive imaging stops. The strobe light consecutive imaging also stops when the imaging is performed three consecutive times without the depressed shutter button being released.

When the CPU 10 judges at Step S15 in FIG. 4 that the strobe light type is currently set to "LED strobe light", the CPU 10 proceeds to Step S51 and resets the exposure conditions (the aperture value, the exposure duration, and the sensitivity) for the LED strobe light based on the exposure conditions set at Step S10 in FIG. 4. The exposure conditions in the exposure conditions storage area are overwritten with the reset exposure conditions, and the reset exposure conditions are stored.

Next, at Step S52, the CPU 10 performs the light-adjusting operation through a preparatory emission of the LED strobe light. In other words, the CPU 10 performs a preparatory illumination of the LED by sending a control signal to the LED strobe light device 16, and at the same time, after making the CCD 5 perform the imaging (electric charge accumulation) operation, the CPU 10 performs a process to read out the electric charges accumulated in the CCD 5.

Next, at Step S53, the CPU 10 calculates a light emission amount of the LED based on the result of the light-adjusting operation (solid light-emitting element light emission amount calculating section). As a result, an adequate amount of light emission of the LED can be calculated.

The light emission amount is calculated such that the optimal exposure amount can be achieved based on a mean value of luminance of the read image data (or some pieces of the image data).

Next, at Step S54, the CPU 10 calculates an LED light amount and the light emission duration of the LED such as to achieve the calculated light emission amount. Here, the light emission amount of the LED calculated at Step S53 indicates the amount of light of the overall light emitted during a first light emission, and the LED light amount indicates an amount of light emitted from the LED per unit of time. Here, the LED light amount increases proportionally with an amount of electric current supplied to the LED and the number of LEDs that are illuminated. This calculated light emission duration is stored in the light emission duration storage area of the buffer memory.

When the LED strobe light is selected as the strobe light type, the LED can be illuminated simply by the LED being supplied with electric current. Therefore, unlike the xenon strobe light, the light emission duration does not change depending on the number of times the light is emitted. The light emission duration can be made shorter than that of the xenon strobe light, and the consecutive imaging speed can also be increased. Also, the light emission duration is calculated such as to be shorter than the exposure duration reset at Step S51.

The CPU 10 performs the consecutive imaging using the LED strobe light. In other words, the CPU 10 controls the LED strobe light device 16 such that the light is emitted during each instance of imaging of the consecutive imaging (light emission controlling section) and performs the consecutive imaging (consecutive imaging controlling section).

Namely, the CPU 10 consecutively performs the LED strobe light imaging in which still-image imaging is performed while the LED is illuminated. First, at Step S55, the CPU 10 starts exposure. At this time, the exposure is started after the electric charges accumulated in the CCD 5 are discharged.

Next, at Step S56, the CPU 10 sends the control signal to the LED strobe light device 16, and thereby the LED strobe light device 16 starts illuminating the LED. At this time, the LED is illuminated with the LED light amount calculated at Step S54. As a result, the LED can be illuminated with an adequate light emission amount.

Next, at Step S57, the CPU 10 starts the timer.

Next, at Step S58, the CPU 10 judges whether the light emission duration has elapsed. In other words, the CPU 10 judges whether the light emission duration stored in the light emission duration storage area (the light emission duration calculated at Step S54) has elapsed.

When the CPU 10 judges at Step S58 that the light emission duration has not elapsed, the CPU 10 remains at Step S58 until the light emission duration is judged to have elapsed. When the light emission duration is judged to have elapsed, the CPU 10 proceeds to Step S59. At Step S59, the CPU 10 sends the control signal to the LED strobe light device 16, and thereby LED strobe light device 16 stops illuminating the LED. As a result, the LED can be illuminated with an adequate light emission amount.

Next, at Step S60, the CPU 10 judges whether the exposure duration has elapsed. The exposure duration is that set at Step S51. In other words, the exposure duration is that stored in the exposure conditions storage area.

When the CPU 10 judges at Step S60 that the exposure duration has not elapsed, the CPU 10 remains at Step S60 until the exposure duration is judged to have elapsed. When the exposure duration is judged to have elapsed, the CPU 10 proceeds to Step S61, and stops the exposure by closing the combination aperture and shutter 4.

The exposure is performed using the combination aperture and shutter 4. However, the exposure can be performed using the electronic shutter as well.

Next, the CPU 10 proceeds to Step S62. At Step S62, the CPU 10 reads out the electric charges accumulated in the CCD 5 (the picked-up image data acquired through still-image imaging using the LED strobe light) via the driver 6 and the TG 7, and then stores the electric charges in the buffer memory. At this time, the CPU 10 performs image processing on the picked-up image data, and the picked-up image data to which image processing has been performed is stored in the buffer memory.

Next, at Step S63, the CPU 10 judges whether the shutter button that is being depressed is released.

When the CPU 10 judges at Step S63 that the depressed shutter button has not been released, the CPU 10 returns to Step S55 and repeats the above-described operation.

Figure 12:
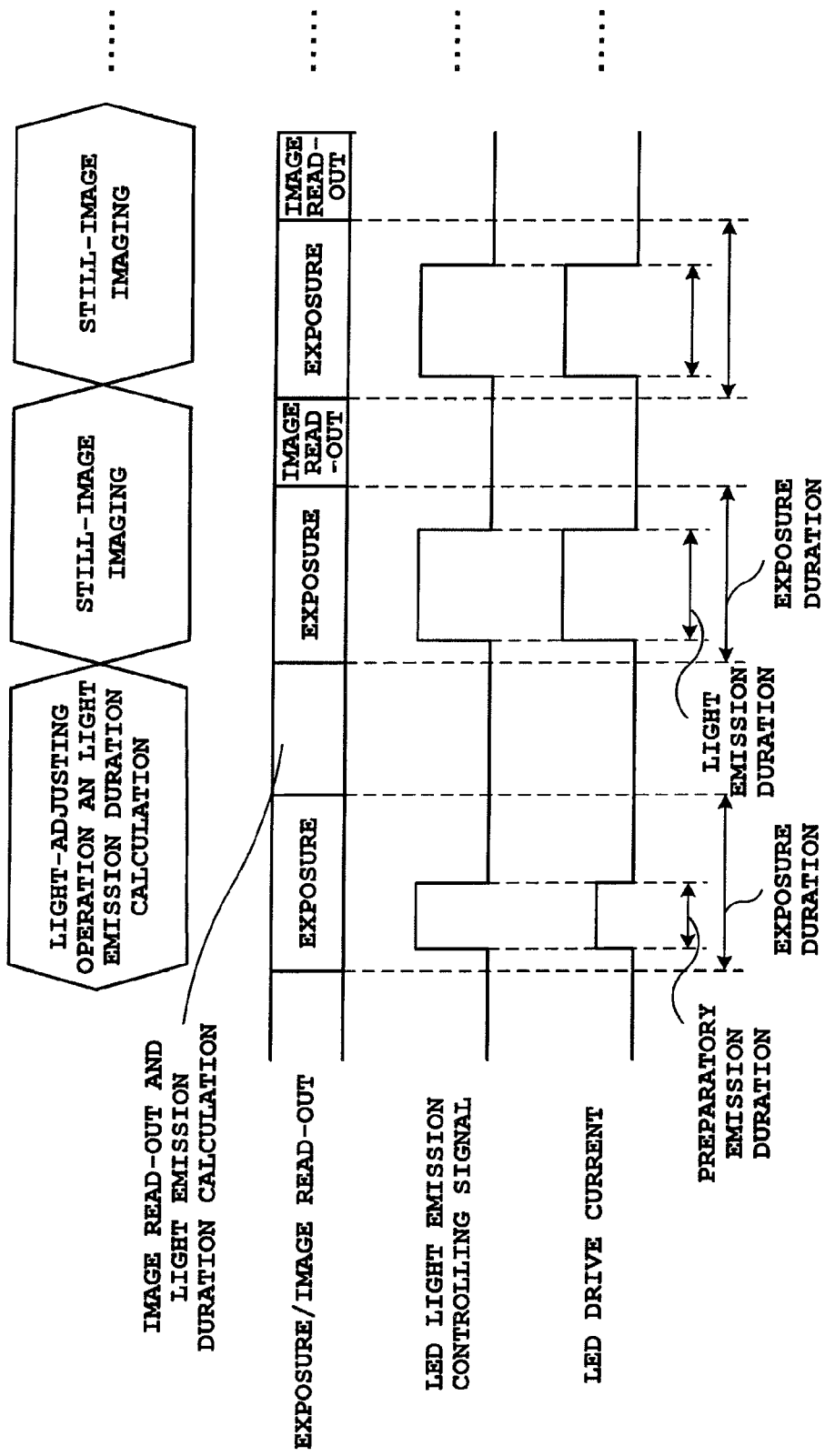
FIG. 12 is a time chart of consecutive imaging using an LED strobe light.

Here, FIG. 12 is a time chart of the consecutive imaging using the LED strobe light. In other words, FIG. 12 is a time chart of the exposure, the image read-out, the light emission controlling signal sent from the CPU 10, and a drive current supplied to the LED.

In FIG. 12, after the light-adjusting operation is performed and the exposure for the still-image imaging is started, the LED driver circuit supplies a drive current to the LED and illuminates the LED, in adherence to the light emission controlling signal sent from the CPU 10. At this time, it is clear that, when the preparatory emission of the light-adjusting operation is performed, the light emission duration is short and the drive current is small (the light emission amount of the LED is small).

In FIG. 12, the light emission controlling signal is sent to the LED strobe light device 16 for every instance of imaging. In other words, the drive current for the LED is supplied for each instance of imaging, and the LED is illuminated. At this time as well, the light emission duration is within the range of the exposure duration.

At the same time, when the CPU 10 judges at Step S63 that the depressed shutter button has been released, the CPU 10 proceeds to Step S64. At Step S64, the CPU 10 compresses each of the one or more pieces of picked-up image data stored in the buffer memory and records the compressed image data.

When the CPU 10 judges at Step S15 in FIG. 4 that the strobe light type is not currently set to "LED strobe light", or in other words, judges that the strobe light type is currently set to "automatically-switched strobe light", the CPU 10 proceeds to Step S71 in FIG. 8, and resets the exposure conditions (the aperture value, the exposure conditions, and the sensitivity) for the xenon strobe light based on the exposure conditions set at Step S10 in FIG. 4.

Next, at Step S72, the CPU 10 performs the light-adjusting operation through a preparatory emission of the xenon strobe light.

Next, at Step S73, the CPU 10 calculates the light emission amount of the xenon tube 27 based on the result of the light-adjusting operation (xenon light emission amount calculating section). As a result, an adequate amount of light emission from the xenon tube 27 can be calculated.

Next, at Step S74, the CPU 10 calculates the duration of the first light emission from the xenon tube 27 such that the calculated light emission amount is achieved. This calculated first light emission duration is stored in the light emission duration storage area of the buffer memory.

Next, at Step S75, the CPU 10 judges whether the calculated first light emission duration of the xenon tube 27 is longer than 24 microseconds.

When the CPU 10 judges at Step S75 that the first light emission duration of the xenon tube 27 is longer than 24 microseconds, the CPU 10 proceeds to Step S76 and forcibly limits the first light emission duration of the xenon strobe light to 24 microseconds. Then, the CPU 10 proceeds to Step S77. At this time, the first light emission duration stored in the light emission duration storage area is overwritten with the light emission duration of 24 microseconds, and the light emission duration of 24 microseconds is stored. As a result, the first light emission duration calculated at Step S74 is deleted.

At the same time, when the CPU 10 judges at Step S75 that the first light emission duration of the xenon tube 27 is not longer than 24 microseconds, the CPU 10 proceeds directly to Step S77.

At Step S77, the CPU 10 calculates the second light emission duration and the third light emission duration. The second light emission duration and the third light emission duration of the xenon tube 27 can be calculated using the first light emission duration of the xenon strobe light calculated at Step S74 (24 microseconds when the limit is applied at Step S76), namely the first light emission duration stored in the light emission duration storage section, and a correction coefficient table such as that shown in FIG. 10B. This calculated second light emission duration and third light emission duration are stored in the light emission duration storage area of the buffer memory.

The light emission duration of each instance of consecutive imaging using the xenon strobe light is made shorter than the exposure duration in the exposure conditions set at Step S31. In the consecutive imaging using the xenon strobe light, as described above, there is a limit to how short the light emission duration can be, and the light emission duration is required to be lengthened to a certain degree depending on the consecutive imaging speed. In other words, the exposure duration is required to be longer than the light emission duration.

Next, at Step S78, the CPU 10 sets the number of imaged frames n to 1 (n=1). At this time, n=1 is stored in the imaged frame count storage area of the buffer memory.

Next, at Step S79, the CPU 10 starts the exposure. At this time, the exposure is started after the electric charges accumulated in the CCD 5 are discharged.

Next, at Step S80, the CPU 10 sends the control signal to the xenon strobe light device 15, and the xenon strobe light device 25 starts illuminating the xenon tube 27.

Next, at Step S81, the CPU 10 starts the timer.

Next, at Step S82, the CPU 10 judges whether the light emission duration for an n-th frame has elapsed. In other words, the CPU 10 judges whether the light emission duration, among the light emission durations stored in the light emission duration storage area, corresponding to the n-th frame stored in the imaged frame count storage area has elapsed.

When the CPU 10 judges at Step S82 that the light emission duration has not elapsed, the CPU 10 remains at Step S82 until the light emission duration is judged to have elapsed. When the light emission duration is judged to have elapsed, the CPU 10 proceeds to Step S83. At Step S83, the CPU 10 sends the control signal to the xenon strobe light device 15, and the xenon strobe light device 15 stops emitting the xenon strobe light. As a result, the xenon tube 27 can be illuminated with an adequate amount of light. In other words, when the light emission duration is forcibly limited to 24 microseconds at Step S36, the strobe light can be emitted with a light emission amount allowing the strobe light to be emitted for the predetermined number of times. When the light emission duration is not limited to 24 microseconds at Step S36, the strobe light can be emitted with a light emission amount allowing adequate exposure amount.

Next, at Step S84, the CPU 10 judges whether the exposure duration has elapsed. The exposure duration is that set at Step S71. In other words, the exposure duration is that stored in the exposure conditions storage area.

When the CPU 10 judges at Step S84 that the exposure duration has not elapsed, the CPU 10 remains at Step S84 until the exposure duration is judged to have elapsed. When the exposure duration is judged to have elapsed, the CPU 10 proceeds to Step S85 and stops the exposure by closing the combination aperture and shutter 4.

The exposure is performed using the combination aperture and shutter 4. However, the exposure can be performed using the electronic shutter as well.

Next, the CPU 10 proceeds to Step S86. At Step S86, the CPU 10 reads out the electric charges accumulated in the CCD 5 (the picked-up image data) via the driver 6 and the TG 7, and then stores the electric charges in the buffer memory. At this time, the CPU 10 performs image processing on the picked-up image data. The picked-up image data to which image processing has been performed is stored in the buffer memory.

Next, the CPU 10 proceeds to Step S87 and judges whether the shutter button that is being depressed is released.

When the CPU 10 judges at Step S87 that the shutter button that is being depressed has not been released, the CPU 10 proceeds to Step S8 and judges whether the number of imaged frames n equals 3 (n=3). In other words, the CPU 10 judges whether the imaging has been performed three consecutive times (frames). This judgment is made based on whether n stored in the imaged frame count storage area is 3.

When the CPU 10 judges at Step S88 that the number of imaged frames n does not equal 3, the CPU 10 proceeds to Step S89 and increments the number of imaged frames n. In other words, the CPU 10 adds 1 to n stored in the imaged frame count storage area. The CPU 10 then returns to Step S79.

At the same time, when the CPU 10 judges at Step S88 that the number of imaged frames n=3, the strobe light imaging can no longer be performed by the xenon tube 27 being illuminated. Therefore, the CPU 10 proceeds to Step S91 in FIG. 9 to switch the strobe light to the LED strobe light, and resets the exposure conditions (the aperture value, the exposure duration, and the sensitivity) from that for the xenon strobe light to that for the LED strobe light. The exposure conditions in the exposure conditions storage area are overwritten with the reset exposure conditions, and the reset exposure conditions are stored.

Next, at Step S92, the CPU 10 performs the light-adjusting operation through the preparatory emission of the LED strobe light. In other words, the CPU 10 performs the preparatory illumination of the LED by sending a control signal to the LED strobe light device 16. At the same time, after making the CCD 5 perform the imaging (electric charge accumulation) operation, the CPU 10 performs a process to read out the electric charges accumulated in the CCD 5.

Next, at Step S93, the CPU 10 calculates the light emission amount of the LED based on the result of the light-adjusting operation (solid light-emitting element light emission amount calculating section). As a result, an adequate amount of light emission of the LED can be calculated.

Next, at Step S94, the CPU 10 calculates an LED light amount and the light emission duration of the LED such as to achieve the calculated light emission amount. Here, the light emission duration is calculated such as to be shorter than the exposure duration reset at Step S91.

Next, at Step S95, the CPU 10 starts exposure. At this time, the exposure is started after the electric charges accumulated in the CCD 5 are discharged.

Next, at Step S96, the CPU 10 sends the control signal to the LED strobe light device 16, and the LED strobe light device 16 illuminates the LED. At this time, the LED is illuminated with the LED light amount calculated at Step S94. As a result, the LED can be illuminated with an adequate light emission amount.

Next, at Step S97, the CPU 10 starts the timer.

Next, at Step S98, the CPU 10 judges whether the light emission duration has elapsed. In other words, the CPU 10 judges whether the light emission duration stored in the light emission duration storage area (the light emission duration calculated at Step S94) has elapsed.

When the CPU 10 judges at Step S98 that the light emission duration has not elapsed, the CPU 10 remains at Step S98 until the light emission duration is judged to have elapsed. When the light emission duration is judged to have elapsed, the CPU 10 proceeds to Step S99. At Step S59, the CPU 10 sends the control signal to the LED strobe light device 16, and the LED strobe light device 16 stops illuminating the LED. As a result, the LED can be illuminated with an adequate light emission amount.

Next, at Step S100, the CPU 10 judges whether the exposure duration has elapsed. The exposure duration is that set at Step S91. In other words, the exposure duration is that stored in the exposure conditions storage area.

When the CPU 10 judges at Step S100 that the exposure duration has not elapsed, the CPU 10 remains at Step S100 until the exposure duration is judged to have elapsed. When the exposure duration is judged to have elapsed, the CPU 10 proceeds to Step S101 and stops the exposure by closing the combination aperture and shutter 4.

The exposure is performed using the combination aperture and shutter 4. However, the exposure can be performed using the electronic shutter as well.

Next, the CPU 10 proceeds to Step S102. At Step S102, the CPU 10 reads out the electric charges accumulated in the CCD 5 (the picked-up image data) via the driver 6 and the TG 7, and then stores the electric charges in the buffer memory. At this time, the CPU 10 performs image processing on the picked-up image data, and the picked-up image data to which image processing has been performed is stored in the buffer memory.

Next, at Step S103, the CPU 10 judges whether the shutter button that is being depressed is released.

When the CPU 10 judges at Step S103 that the depressed shutter button has not been released, the CPU 10 returns to Step S95 and repeats the above-described operation.

At the same time, when the CPU 10 judges at Step S87 in FIG. 8 and at Step S103 that the depressed shutter button has been released, the CPU 10 proceeds to Step S104. At Step S104, the CPU 10 compresses each of the one or more pieces of picked-up image data stored in the buffer memory and records the compressed image data.

In this way, when the strobe light type is set to "automatically-switched strobe light", the consecutive imaging is performed using a combination of the xenon strobe light and the LED strobe light. In other words, to emit light during each instance of imaging of the consecutive imaging, first, the CPU 10 controls the xenon strobe light device 15 to illuminate the xenon tube 27 (light emission controlling section). When the xenon tube 27 is illuminated the predetermined number of times, the strobe light is switched to the LED strobe light. Then, the CPU 10 controls the LED strobe light device 16 to illuminate the LED (light emission controlling section) and performs the consecutive imaging (consecutive imaging controlling section). In other words, the CPU 10 preferentially emits the xenon strobe light over the LED strobe light.

A-3. Effects

As described above, according to the first embodiment, when the strobe light is set to "automatically-switched strobe light", the strobe light consecutive imaging can be performed up to the predetermined number of times (predetermined number of frames) by illuminating the xenon tube 27 having a large light amount. Also, wWhen the predetermined number of times is exceeded, the strobe light is switched to the LED strobe light. Therefore, the strobe light can be adequately emitted, and the strobe light consecutive imaging can be performed as many times as desired.

The strobe light consecutive imaging up to the predetermined number of times is performed by illuminating the xenon tube 27 having a large light amount. Therefore, an optimal exposure amount can be achieved, and because sensitivity is not required to be enhanced, deterioration in image quality can be prevented.

When the strobe light is set to "xenon strobe light", a strobe light consecutive imaging achieving the optimal exposure amount can be performed with certainty, although only up to the predetermined number of times.

When the strobe light is set to "LED strobe light", the strobe light consecutive imaging can be performed as many times as desired.

B. Second Embodiment

B-1. Configuration

Next, a second embodiment of the invention will be described.

According to the first embodiment, when imaging is performed while the strobe light is emitted, the strobe light imaging is performed using the strobe light type selected by the user. However, the LED strobe light can be forcibly used for strobe light imaging when the consecutive imaging speed of consecutive imaging is high, regardless of the selected strobe light type. The consecutive imaging speed refers to a number of times imaging is performed per unit of time (imaging interval). The higher the number of times imaging is performed is, the higher the consecutive imaging speed. For example, when the consecutive imaging is performed 10 times per second and when the consecutive imaging is performed 5 times per second are compared, the consecutive imaging speed is higher when the consecutive imaging is performed 10 times per second.

The CPU 10 sets the consecutive imaging speed to a speed arbitrarily selected by the user through setting mode and the like (imaging interval setting section). This set speed is stored in a consecutive imaging speed storage area of the memory 9.

B-2. Operations of the Digital Camera 1

According to the second embodiment as well, the imaging device of the present invention is actualized using the digital camera 1 having the same configuration as that shown in FIG. 1.

An operation performed by the digital camera 1 according to the second embodiment will be described with reference to the flowchart in FIG. 13.

Figure 13:
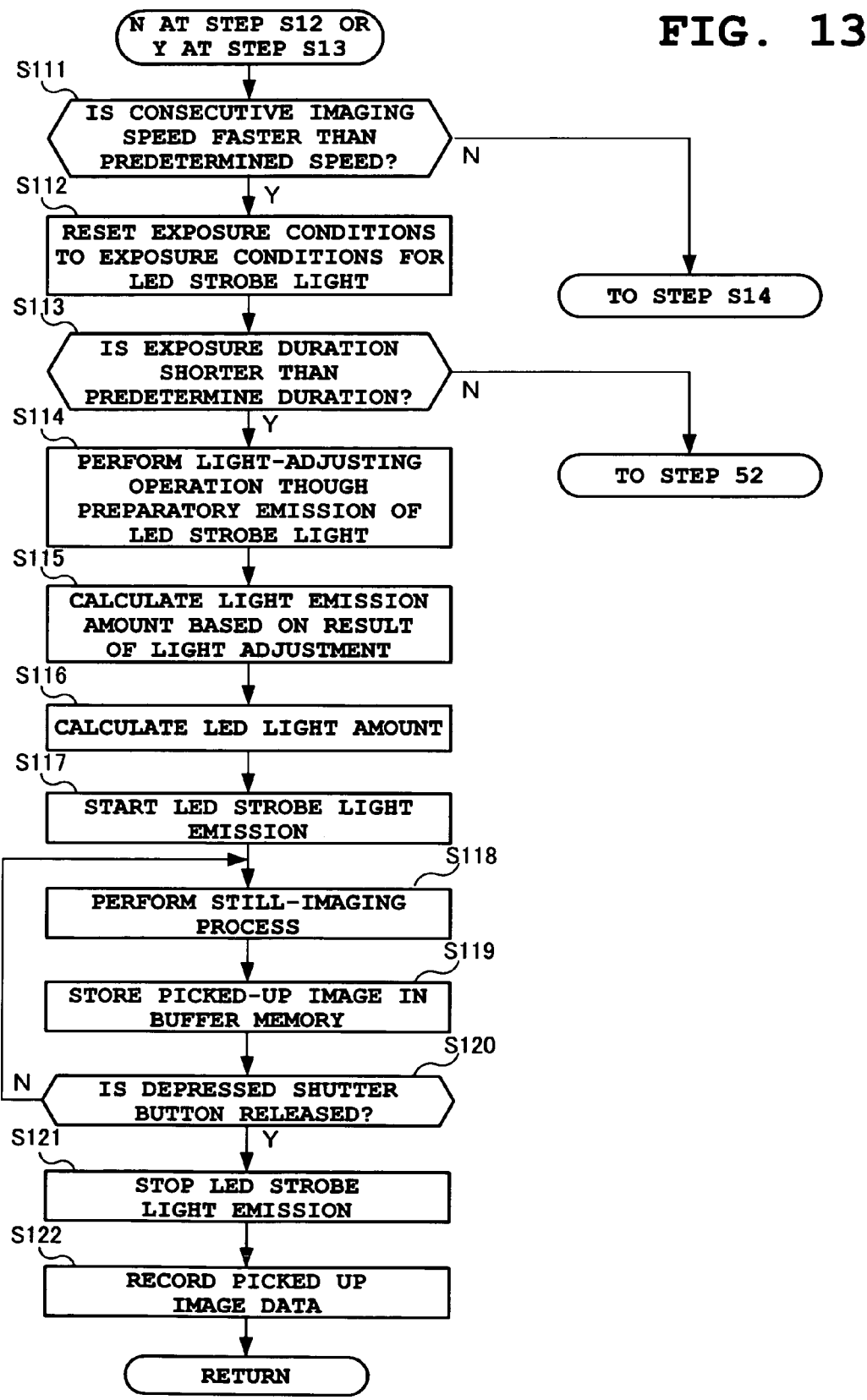
FIG. 13 is a flowchart of operations performed by a digital camera 1 according to a second embodiment.

When the CPU 10 judges at Step S12 in FIG. 4 that the emission of strobe light is not currently set to "automatic strobe light emission", or in other words, judges that the emission of strobe light is currently set to "forced strobe light emission", or when the CPU 10 judges at Step S13 that the emission of strobe light is currently set to "automatic strobe light emission" and the strobe light is to be emitted, the CPU 10 proceeds to Step S111 in FIG. 13. At Step S111, the CPU 10 judges whether a currently set consecutive imaging speed is faster than a predetermined speed. In other words, the CPU 10 judges whether a currently set imaging interval is shorter than a predetermined interval (imaging interval judging section).

When the CPU 10 judges at Step S11 that the consecutive imaging speed is not faster than the predetermined speed, the CPU 10 proceeds to Step S14 in FIG. 4 and performs the same operation as that according to the first embodiment. Regarding the predetermined speed, an upper limit of the consecutive imaging speed at which the consecutive imaging can be performed through the consecutive imaging using the xenon strobe light or an upper limit of the light emission interval at which the xenon strobe light is consecutively emitted depending on the consecutive imaging are preferably set in advance.

At the same time, when the CPU 10 judges at Step S111 that the consecutive imaging speed is faster than the predetermined speed, the CPU 10 proceeds to Step S112 and resets the exposure conditions (the aperture, the exposure amount, and the sensitivity) for the LED strobe light based on the exposure conditions set at Step S10 in FIG. 4. In other words, when the consecutive imaging speed is faster than the predetermined speed, the consecutive imaging using the xenon strobe light cannot be performed (the strobe light cannot be emitted at the light emission interval adhering to the consecutive imaging speed). Therefore, even when a type ("xenon strobe light" or "automatically-switched strobe light") other than "LED strobe light" is set as the strobe light type, the strobe light type is forcibly set to "LED strobe light". This is because, when the strobe light type is set to "xenon strobe light", compared to when the strobe light is set to "LED strobe light", there is a limit to how much the light emission interval and the light emission duration can be shortened.

As a result, the strobe light imaging can be consecutively performed appropriately. In other words, the strobe light can be emitted every time the imaging is performed.

Next, at Step S113, the CPU 10 judges whether the exposure duration of the set exposure conditions for the LED strobe light is shorter than a predetermined duration. This exposure duration becomes shorter in adherence to the consecutive imaging speed.

The judgment on whether the exposure duration is shorter than the predetermined duration is made to judge whether an operation is performed for continuously illuminating the LED during the consecutive imaging. This is because, when the exposure duration is shorter than the determined duration, if the LED is illuminated synchronously with an exposure timing or the like every time the imaging is performed through consecutive imaging, the configuration and control of the LED strobe light device 16 becomes complex.

When the CPU 10 judges at Step S113 that the exposure duration is not shorter than the predetermined duration, the CPU 10 proceeds to Step S52 in FIG. 7. In other words, when the CPU 10 judges that the exposure duration is not shorter than the predetermined duration, the operation is performed for synchronously illuminating the LED with the exposure timing or the like every time the imaging is performed through consecutive imaging.

At the same time, when the CPU 10 judges at Step S113 that the exposure duration is shorter than the predetermined duration, the CPU 10 proceeds to Step S114 and performs the light-adjusting operation through the preparatory emission of the LED strobe light. In other words, the CPU 10 performs the preparatory illumination of the LED by sending a control signal to the LED strobe light device 16, and at the same time, after making the CCD 5 perform the imaging (electric charge accumulation) operation, the CPU 10 performs a process to read out the electric charges (image data) accumulated in the CCD 5.

Next, at Step S115, the CPU 10 calculates the light emission amount of the LED based on the result of the light-adjusting operation (solid light-emitting element light emission amount calculating section).

The light emission amount is calculated such that the optimal exposure amount can be achieved based on the mean value of the luminance of the read image data (or some pieces of the image data).

Next, at Step S116, the CPU 10 calculates the LED light amount such as to achieve the calculated light emission amount. Here, the LED is continuously illuminated while the consecutive imaging is being performed. Therefore, the light emission duration of the LED for each instance of imaging is the same as the exposure duration. Thus, since the light emission duration of the LED is the same as the exposure duration set at Step S112, the LED light amount is calculated such as to achieve the calculated light emission amount when the LED is illuminated during the set exposure duration.

Then, the CPU 10 performs the consecutive imaging using the LED strobe light. In other words, the CPU 10 controls the LED strobe light device 16 such that the light is emitted during each instance of imaging of the consecutive imaging (light emission controlling section) and performs the consecutive imaging (consecutive imaging controlling section). Here, the LED is continuously illuminated during the consecutive imaging.

Specifically, first, at Step S117, the CPU 10 sends a control signal to the LED strobe light device 16, and the LED strobe light device 16 starts illuminating the LED (light emission controlling section). At this time, the LED is illuminated with the LED light amount calculated at Step S116.

Next, at Step S118, the CPU 10 performs the still-image imaging process. In other words, the CPU 10 performs exposure and reads out the electric charges accumulated in the CCD 5 during the exposure duration calculated at Step S112.

Next, at Step S119, the CPU 10 stores the picked-up image data acquired through the imaging process in the buffer memory.

Next, at Step S120, the CPU 10 judges whether the shutter button that is being depressed by the user is released.

When the CPU 10 judges at Step S120 that the depressed shutter button has not been released, the CPU 10 returns to Step S118.

Figure 14A:
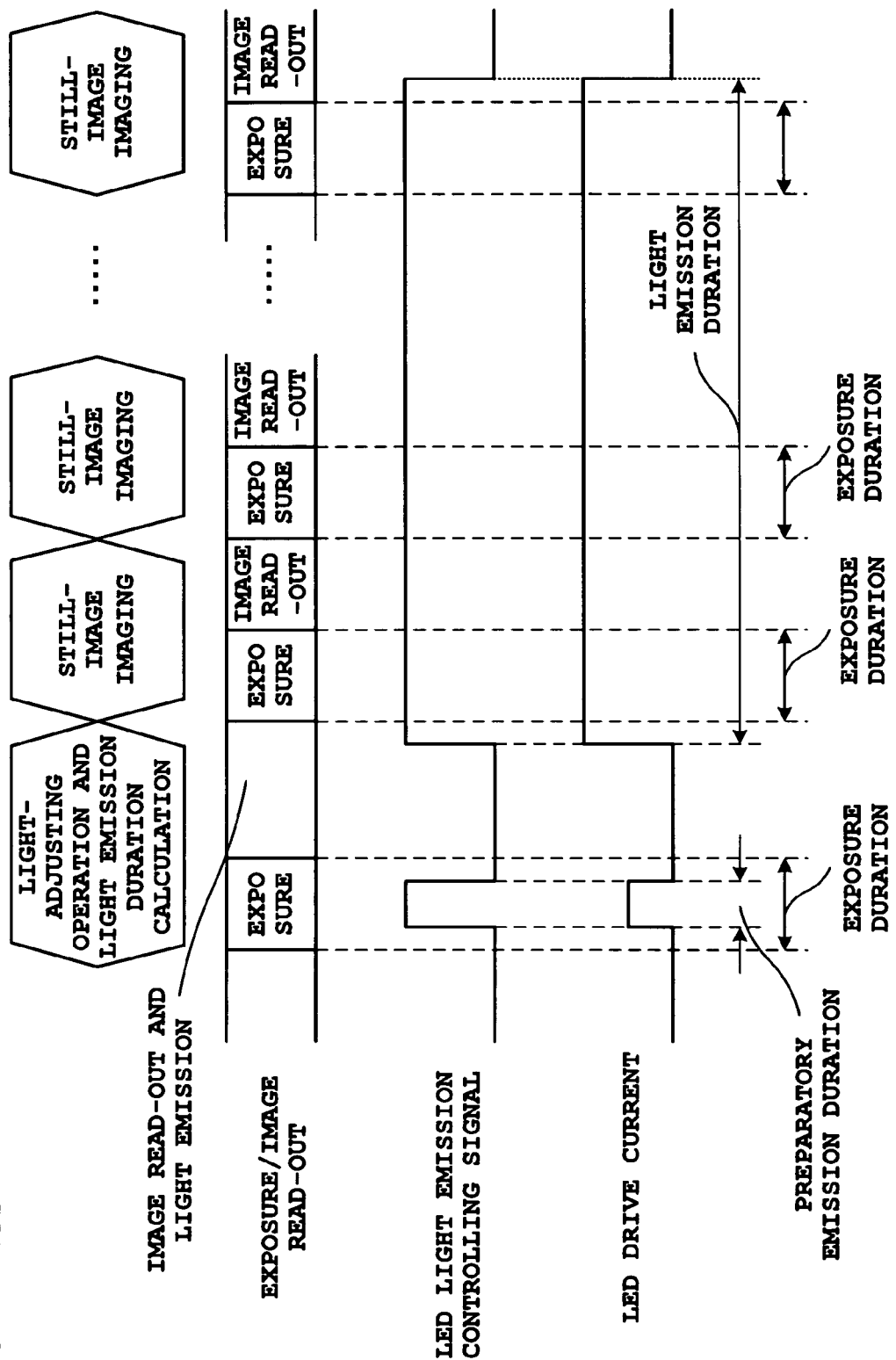
FIG. 14A is a time chart of consecutive imaging performed using an LED strobe light according to the second embodiment.

FIG. 14A is a time chart of the consecutive imaging using the LED strobe light according to the second embodiment. In other words, FIG. 14A is a time chart of the exposure, the image read-out, the light emission controlling signal sent from the CPU 10, and the drive current provided to the LED.

In FIG. 14A, before the consecutive imaging is started, the LED driver circuit supplies the CPU with the drive current and illuminates the LED in adherence to the light emission controlling signal sent from the CPU 10.

Then, the CPU 10 performs the consecutive imaging in which still-image imaging is performed consecutively. It is clear that the emission of the LED strobe light is completed when the consecutive imaging is completed. In other words, the LED strobe light is continuously emitted while the consecutive imaging is being performed.

The light-adjusting operation is the same as that according to the first embodiment. Therefore, explanations thereof are omitted.

At the same time, when the CPU 10 judges at Step S120 that the depressed shutter button has been released, the CPU 10 proceeds to Step S121 and stops the illumination of the LED by sending a control signal to the LED strobe light device 16.

Next, at Step S122, the CPU 10 compresses each of the one or more pieces of picked-up image data stored in the buffer memory and records the compressed image data.

B-3. Effects

As described above, according to the second embodiment, when the consecutive imaging speed is faster than the predetermined speed, the strobe light is forcibly switched to the LED strobe light. Therefore, the strobe light can be adequately emitted at a light emission interval adhering to the consecutive imaging speed.

When the exposure duration is shorter than the predetermined duration, the LED is continuously illuminated while the consecutive imaging is being performed. Therefore, the synchronicity of the imaging timing and the light emission timing can be easily controlled. Thus, processing load can be reduced and the speed strobe light consecutive imaging can be performed at an even higher speed.

C. Third Embodiment

Next, a third embodiment of the invention will be described.

In the description, cases when the exposure duration for consecutive imaging is short and adequate exposure amount cannot be achieved when the consecutive imaging using the LED strobe light is performed, according to the third embodiment, will be described.

C-1. Operations of the Digital Camera 1

According to the third embodiment as well, the imaging device of the present invention is actualized using the digital camera 1 having the same configuration as that shown in FIG. 1.

An operation performed by the digital camera 1 according to the third embodiment will be described with reference to a flowchart in FIG. 15.

When the CPU 10 calculates the LED light amount and the light emission duration for the LED at Step S54 in FIG. 7, the CPU 10 proceeds to Step S131 in FIG. 15 and judges whether image data having the optimal exposure amount can be achieved even when the LED is illuminated (judging section). For example, the CPU 10 judges that the optimal exposure amount cannot be achieved when light cannot be emitted with the light emission amount calculated at Step S53, even when the LED is illuminated with the LED light amount and the light emission duration set at Step S54 in FIG. 7. In other words, even when the LED light amount is at maximum and the light emission duration is as long as the exposure duration, the optimal light exposure is judged not to be achieved when light cannot be emitted with the light emission amount calculated at Step S53.

When the CPU 10 judges at Step S131 that the optimal exposure amount can be achieved, the CPU 10 proceeds to Step S55 in FIG. 7. When the CPU 10 judges that the optimal exposure amount cannot be achieved, the CPU 10 proceeds to Step S132, and switches the digital camera 1 to N-frame image additive-compositing mode in which additive-compositing is performed on N frames of images. In N-frame image additive-compositing mode, for each instance of imaging of the consecutive imaging, N frames of image data are consecutively imaged (sub-imaged) at a higher speed. In other words, sub-imaging is performed a plurality of times (N times) during each imaging period that occurs at the predetermined imaging interval. Then, a single frame of composite image data acquired through additive compositing being performed on the N frames of sub-imaged image data serves as each image data picked up through consecutive imaging. For example, in N-frame (here, N=4) image additive-compositing mode, four frames of image data are consecutively picked up at a high speed during each period over which a frame of image data, acquired through consecutive imaging, is acquired. Then, additive compositing is performed on the four frames of image data and a single frame of composite image data is generated. The frames of generated composite image data respectively serve as the frames of image data acquired through consecutive imaging.

Next, at Step S133, the CPU 10 calculates an exposure duration T of the imaging in additive-compositing mode. This calculation can be performed by the exposure duration set at Step S51 in FIG. 7 being divided by the number of added frames N. In other words, the exposure duration of each instance of imaging of the consecutive imaging, set at Step S51, is calculated by the number of frames of image data. As a result, the image data to which the additive compositing is performed can be imaged during each instance of imaging of the consecutive imaging set at Step S51.

The period of each instance of imaging of the consecutive imaging is divided by N. As a result, a period required to pick up a single frame of image data to which additive compositing has been performed can be calculated, and the exposure duration can be determined based on the calculated period. For example, when the period of each instance of imaging of the consecutive imaging is 10, when the number of image data to which additive compositing is performed is 4 (N=4), the period required to pick up a single frame of image data to which additive compositing has been performed is 2.5. The exposure duration required for imaging can be determined based on the period of 2.5. Because an exposure period and an image read-out period are required during imaging, the exposure period is determined by the period required for reading out the image being subtracted from 2.5.

Next, at Step S134, the CPU 10 starts the LED strobe light emission.

Next, at Step S135, the CPU 10 makes the CCD 5 perform the imaging (electric charge accumulating) operation during the exposure duration calculated at Step S133. Then, the CPU 10 performs a still-image imaging process to read out the accumulated electric charges (image data). Next, at Step S136, the CPU 10 stores the image data acquired in the still-image imaging process in the buffer memory. At this time, the image data is Bayer data.

Next, at Step S137, the CPU 10 stores M=1 in an additive imaging frame count storage area of the buffer memory. M indicates a number of frames of image data that has been shot, to which the additive compositing is performed.

Next, at Step S138, the CPU 10 judges whether M equals N (M=N).

When the CPU 10 judges at Step S138 that M does not equal N, the CPU 10 returns to Step S135 and repeats the above-described operation.

At the same time, when the CPU 10 judges at Step S138 that M=N, the CPU 10 proceeds to Step S139 and stops the LED strobe light emission.

Next, at Step S140, the CPU 10 performs additive compositing on the N frames of image data picked up and stored in the buffer memory. Then, the CPU 10 generates a single frame of composite image data (generating section), and stores the generated composite image data in the buffer memory. At this time, the N frames of image data from which the composite image data is generated can be deleted. Additive compositing is performed using the degree of correlation between each frame of image data to which additive compositing is to be performed and template matching. Also, additive compositing is performed such that luminance patterns, contours, and color characteristics of main subject areas in each image to which additive compositing is to be performed are respectively positioned to overlap at the same position. As a result of additive compositing, signal-to-noise (S/N) ratio becomes higher than that of a single image, and an image with high-sensitivity can be achieved.

Figure 16:
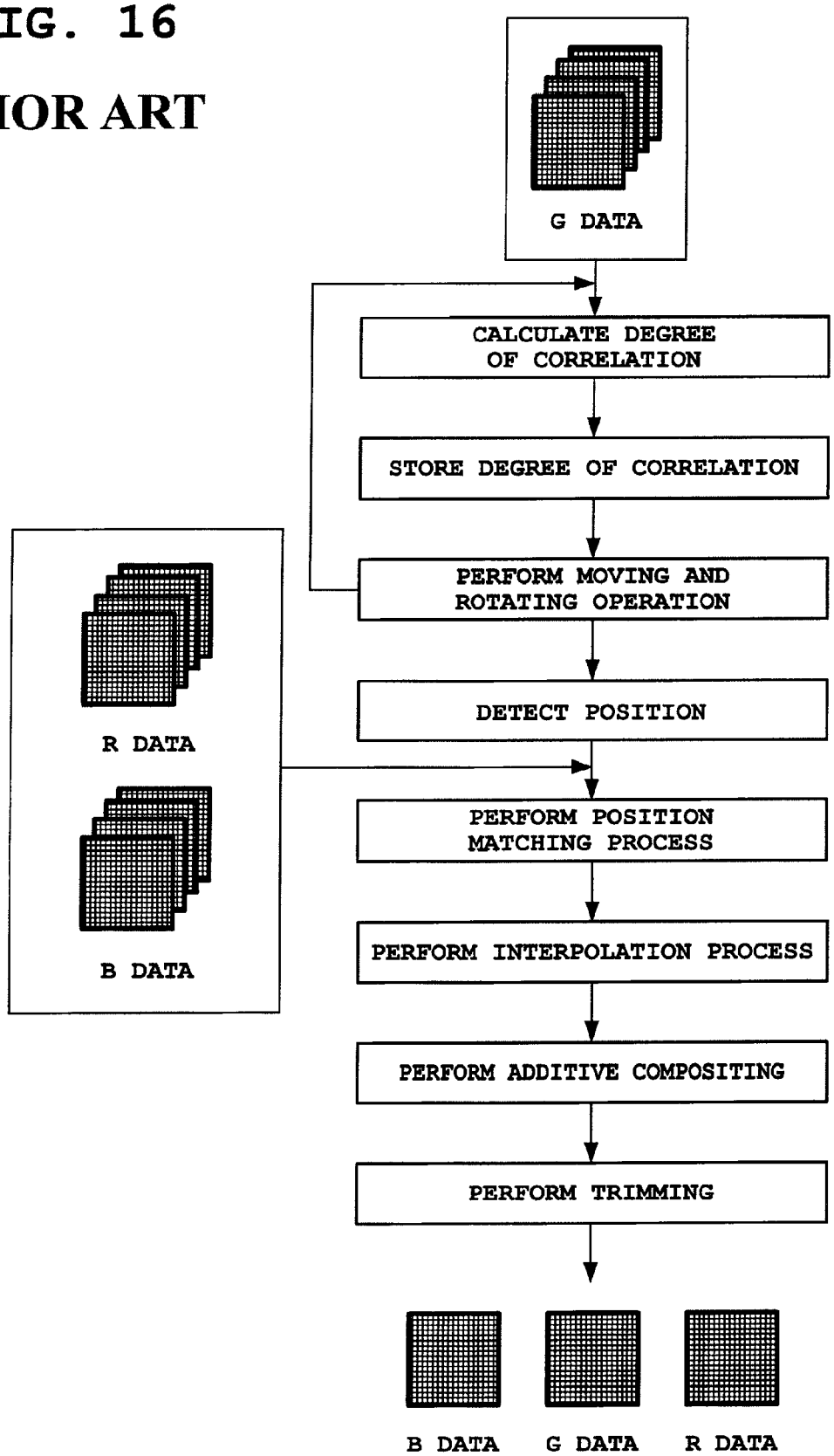
FIG. 16 is a functional block diagram of a CPU 10 performing additive compositing.

FIG. 16 is an example of a functional block diagram of the CPU 10 that performs the additive compositing at Step S140.

The CPU 10 calculates the degree of correlation between each frame of image data based on image data (G data) of a G component in the N frames of image data that is the Bayer data stored in the buffer memory (degree of correlation calculation), and stores the calculated degrees of correlation in the buffer memory (degree of correlation storage). Next, the CPU 10 moves and rotates the image data (moving and rotating operation), and calculates the degrees of correlation for each image data during movement and rotation. Then, the CPU 10 stores the calculated degrees of correlation. The CPU 10 detects the position at which the degree of correlation is the highest for each frame of image data by moving and rotating the image data as described above (position detection). In other words, the CPU 10 detects the position of each frame of image data at which the images in each image data most match.

The CPU 10 performs a position matching process for each piece of G data, based on the detected positions (position matching process). Then, the CPU 10 performs an interpolation process on each piece of G data and generates a single frame of full-pixel G data for each piece of G data. In other words, data for each color, red, green and blue (RGB), are combined to create the single frame of full-pixel G data. A full-pixel image data cannot be created by only the G data. Therefore, the full-pixel G data is created through the interpolation process (interpolation process). A single frame of G data is generated by additive compositing being performed on each of the generated full-pixel G data. The G data is trimmed to a picked-up image size for consecutive imaging.

The CPU 10 performs the position matching process on image data of an R component of the N frames of image data that are Bayer data stored in the buffer memory, based on the detected position of each piece of image data (the positions detected to perform the position matching process for the G data). Then, the CPU 10 performs the interpolation process on each piece of R data and generates a single frame of full-pixel R data for each piece of R data. A single frame of R data is generated by additive compositing being performed on each of the generated frames of full-pixel R data. The R data is trimmed to a picked-up image size for consecutive imaging. A trimming range over which the R data is trimmed is the trimming range of the G data.

The CPU 10 similarly performs the position matching process on image data of a B component of the N frames of image data that are Bayer data stored in the buffer memory, based on the detected position of each piece of image data (the positions detected to perform the position matching process for the G data). The CPU 10 performs the interpolation process on each piece of B data and generates a single frame of full-pixel B data for each piece of B data. A single frame of B data is generated by additive compositing being performed on each of the generated frames of full-pixel B data. The B data is trimmed to a picked-up image size for consecutive imaging. A trimming range over which the B data is trimmed is the trimming range of the G data. Additive compositing is performed in this way. Image data of the luminance and color difference signal is generated based on the generated single frames of full-pixel R, G and, B data.

Next, at Step S141, the CPU 10 judges whether the shutter button that is being depressed is released.

When the CPU 10 judges that the depressed shutter button has not been released, the CPU 10 sets M stored in the additive imaging frame count storage area of the buffer memory to 0, and then returns to Step S134.

Figure 17A:
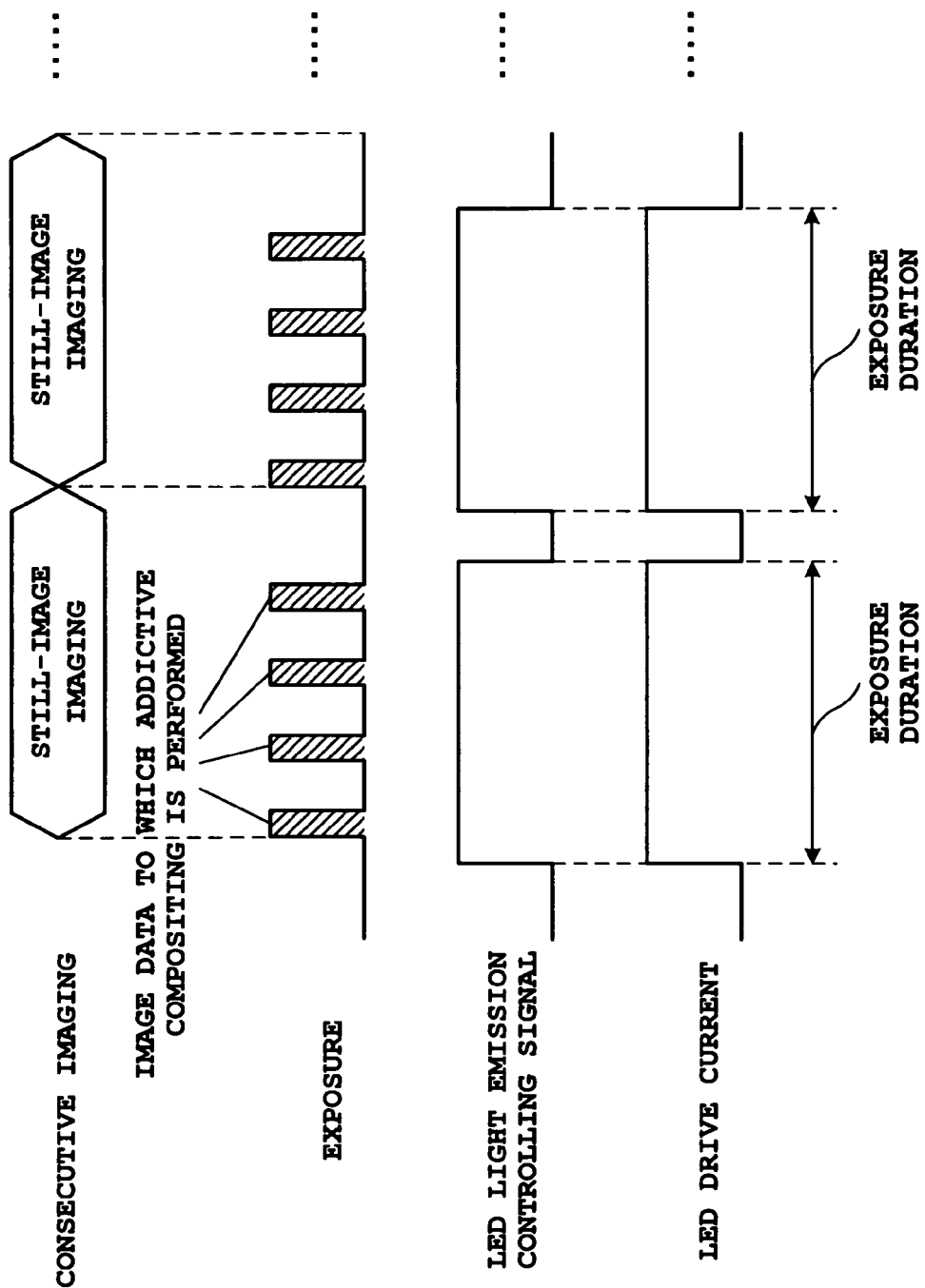
FIG. 17A is a time chart of consecutive imaging performed using an LED strobe according to a third embodiment.

FIG. 17A is a time chart of the consecutive imaging using the LED strobe light according to the third embodiment. In other words, FIG. 17A is a time chart of the exposure, the light emission controlling signal set from the CPU 10, and the drive current supplied to the LED. Shaded portions of the diagram indicate exposure.

In FIG. 17A, the CPU 10 performs exposure N times during the period of each instance of still-image imaging of the consecutive imaging, and stores the image data of which exposure has been performed N times in the buffer memory.

Additive compositing is performed on the N frames of image data acquired through N exposures, and a single frame of image data is created. It is clear from FIG. 17A that the LED strobe light is emitted every time the still-image imaging is performed (in other words, the LED is continuously illuminated while the N exposures are being performed, and the LED stops being illuminated when the N exposures are completed).

The light-adjusting operation is the same as that according to the first embodiment. Therefore, explanations thereof are omitted.

At the same time, when the CPU 10 judges at Step S141 that the depressed shutter button has been released, the CPU 10 compresses each of the one or more frames of composite image data stored in the buffer memory and records the compressed image data in the flash memory 13.

C-2. Effects

As described above, according to the third embodiment, when the CPU 10 judges that the optimal exposure amount cannot be achieved, the CPU 10 consecutively images N frames of image data at a higher speed for each instance of imaging of the consecutive imaging. A single frame of composite image data acquired through additive compositing being performed on the N frames of picked-up image data serves as each image data picked up through consecutive imaging. As a result, the S/N ratio of each frame of image data acquired through consecutive imaging can be increased, and a highly-sensitive strobe light consecutive imaging can be performed.

D. Variation Examples

The following variations of each embodiment described above are possible.

(1) According to each embodiment, the strobe light consecutive imaging is started by the shutter button being depressed, and is stopped by the depressed shutter button being released. However, the strobe light consecutive imaging can be started by the shutter button being depressed and stopped by the shutter button being depressed again.

(2) According to each embodiment, the strobe light consecutive imaging is started by the shutter button being depressed, and is stopped by the depressed shutter button being released. However, the user can set in advance the number of times (the number of frames) the consecutive imaging is performed, and the imaging can be consecutively performed for the set number of frames, automatically, when the shutter button is depressed.

At this time, the strobe light consecutive imaging is performed as follows. When the number of times (the number of frames) the consecutive imaging is performed, which is set by the user, is less than the predetermined number of times or frames, the strobe light type can be automatically set to the xenon strobe light. When the number of times the consecutive imaging is performed, which is set by the user, exceeds the predetermined number of times, the strobe light type is automatically set to the automatically-switched strobe light or the LED strobe light.

(3) According to each embodiment, the number of times the xenon strobe light is emitted is limited to the predetermined number of times. However, the number of times the xenon strobe light is emitted can be unlimited. For example, if the number of times the xenon strobe light is emitted is uniformly limited even when the light emission amount is small, the voltage at the main capacitor 23 cannot be effectively used. In other words, the predetermined number of times is not limited to three times. The predetermined number of times is the number of times light emission can be performed without the main capacitor 23 being recharged.

In this case, the consecutive imaging using the xenon strobe light is stopped when the voltage at the main capacitor 23 drops below the threshold voltage (260 volts, herein) for the first time.

In this case, when the operation at Step S34 in FIG. 6 or the operation at Step S74 in FIG. 8 is completed, the CPU 10 proceeds directly to Step S39 or Step S79. At Step S48 or Step S88, the CPU 10 judges whether the voltage in the main capacitor 23 is lower than the threshold value. When the CPU 10 judges that the voltage is not lower than the threshold value, the CPU 10 proceeds to Step S49 or Step S89 and calculates the light emission duration of the xenon strobe light required for the next instance of imaging. Then CPU 10 returns to Step S39 or Step S79. As a result, the strobe light imaging can be continuously performed for the predetermined number of times.

(4) According to each embodiment, when the first light emission duration of the xenon strobe light is longer than the fixed duration at Step S35 in FIG. 6 or Step S75 in FIG. 8, the first light emission duration is forcibly set to the fixed duration at Step S36 or Step S76. However, the first light emission duration is not required to be forcibly set. In other words, the processes at Step S35 and Step S36 in FIG. 6 and at Step S75 and Step S76 in FIG. 8 are not required to be performed. This is because, when the light emission duration is forcibly shortened, the optimal exposure amount cannot be achieved.

In this case, as in the variation example (3), the consecutive imaging using the xenon strobe light is stopped when the voltage in the main capacitor 23 drops below the threshold voltage (260 volts, herein) for the first time.

(5) According to each embodiment, when the LED strobe light is emitted, the LED strobe light is emitted for each instance of imaging of the consecutive imaging. However, the LED strobe light can be emitted such as to flash continuously and intermittently while the consecutive imaging is being performed (at an interval shorter than the imaging interval of the consecutive imaging, or in other words, asynchronously with the imaging timing). As a result, the synchronicity of the imaging timing and the light emission timing can be easily controlled and processing load can be reduced.

(6) According to each embodiment, whether the optimum exposure amount can be achieved even when the strobe light is emitted is judged. When the optimum exposure amount cannot be achieved, sensitivity can be enhanced by the image data picked up by the CCD 5 being read out by the CCD 5 being driven to perform pixel addition. Alternatively, the sensitivity of the image data acquired by the CCD 5 can be enhanced by, for example, increasing the gain of the AGC circuit in the unit circuit 8. As a result, an image data having adequate light amount and luminance can be acquired.

(7) According to the second embodiment, the LED is continuously illuminated while the consecutive imaging is being performed. However, the LED strobe light can be emitted such as to flash intermittently. In other words, the LED strobe light can be emitted at a shorter interval than the imaging interval of the consecutive imaging, such as to be asynchronous with the imaging timing.

Figure 14B:
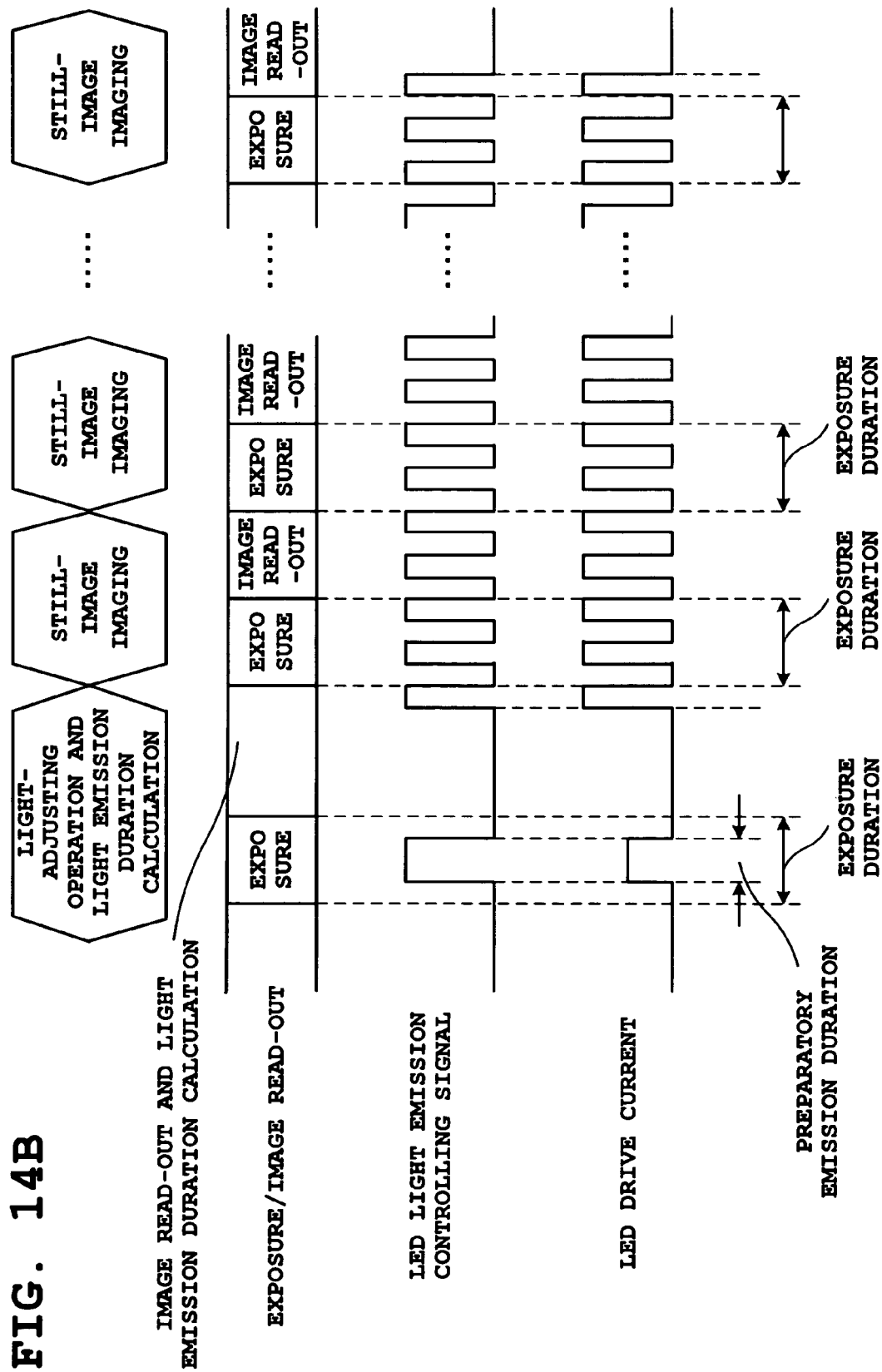
FIG. 14B is a time chart of the consecutive imaging performed using the LED strobe light according to the second embodiment.

FIG. 14B is a time chart of the consecutive imaging using the LED strobe light in the variation example (6). In other words, FIG. 14B is a time chart of the exposure, the image read-out, the light emission controlling signal sent from the CPU 10, and the drive current supplied to the LED.

As is clear from FIG. 14, the illumination of the LED is not performed and stopped every time the still-image imaging is performed. The LED is intermittently illuminated asynchronously with an imaging cycle of the still-image imaging. In other words, the LED is repeatedly illuminated even during exposure. As a result, power consumption can be reduced.

(8) According to the third embodiment, when the LED strobe light is emitted, whether the optimal exposure amount can be achieved is judged. However, this can also be applied to when the strobe light is set to "xenon strobe light" and "automatically-switched strobe light". Whether the optimal exposure amount can be achieved is judged, and when judged that the optimal exposure amount cannot be achieved, the digital camera 1 is switched to N-frame image additive compositing mode. Then, N frames of image data are consecutively picked up at an even higher speed for every instance of imaging of the consecutive imaging, and a single frame of composite image data acquired through additive compositing being performed on the N frames of picked-up image data serves as each image data picked up through consecutive imaging. In this case, when the strobe light is set to "xenon strobe light", the xenon strobe light can be emitted. When the strobe light is set to "automatically-switched strobe light", the xenon strobe light and the LED strobe light, or only the "LED strobe light" can be forcibly emitted.

(9) The third embodiment can be applied to the second embodiment. According to the third embodiment, when imaging of the pieces of image data (N frames of image data) to which additive compositing is to be performed is completed, the emission of the LED strobe light is stopped at Step S139. However, when the third embodiment is applied to the second embodiment, the LED strobe light is emitted until the shutter button that is being depressed is released.

Figure 17B:
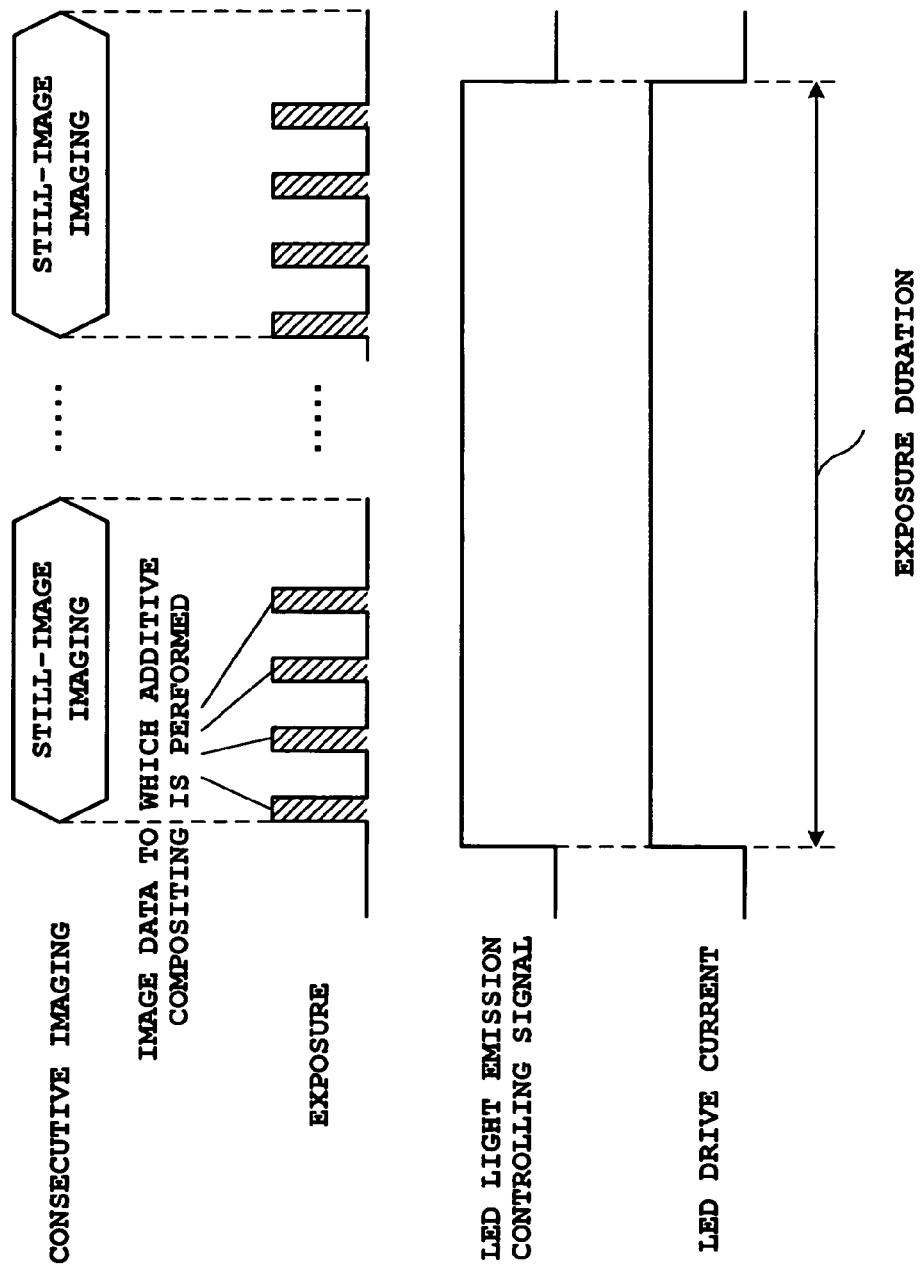
FIG. 17B is a time chart of the consecutive imaging performed using the LED strobe according to the third embodiment.

FIG. 17B is a time chart of the consecutive imaging using the LED strobe light in the variation example (7). In other words, FIG. 17B is a time chart of the exposure, the light emission controlling signal sent from the CPU 10, and the drive current supplied to the LED. The shaded portions of FIG. 17B indicate exposure.

As is clear from FIG. 17B, the LED is continuously illuminated during the consecutive imaging. Also as is clear from FIG. 17B, exposure is performed N times during the period of each still-image imaging, and the LED continues being illuminated even after the N exposures are completed.

Rather than the LED being continuously illuminated during the consecutive imaging, the LED can be illuminated such as to flash intermittently, in other words, the LED can be illuminated such as to flash at a shorter cycle than the imaging cycle.

(10) According to the third embodiment, when judged that the optimal exposure amount cannot be achieved, the digital camera 1 is switched to N-frame image additive compositing mode. However, the digital camera 1 can be switched to N-frame image additive-compositing mode only when the optimal exposure amount is judged to not be achieved, and the consecutive imaging speed of the strobe light consecutive imaging is less than a constant speed, or in other words, the imaging interval is longer than a constant interval. When the consecutive imaging speed of the strobe light consecutive imaging is high and the digital camera 1 is switched to N-frame image additive compositing mode, the consecutive imaging (sub-imaging) is required to be performed at an even higher speed, and thus processing load increases. Also, the exposure duration T in additive-compositing mode becomes significantly short, and even when additive compositing is performed on the N frames of image data, the optimal exposure amount may not be achieved. Thus, because the digital camera 1 is switched to the N-frame image additive compositing mode only when the consecutive imaging speed is lower than the constant speed and the imaging interval is longer than the constant interval, processing load can be reduced. Finally, when the imaging apparatus of the invention is applied to the digital camera 1 according to the above-described embodiments, it is not limited to these embodiments. It is only required that the invention be applied to a device that can consecutively image a subject using the xenon strobe light and the solid light emitting element.

Furthermore, although the computer program product of the imaging apparatus which is a preferred embodiment of the present invention is stored in the memory (such as a Read-Only Memory (ROM) of the imaging apparatus, this processing program is stored on a computer-readable medium and should also be protected in the case of manufacturing, selling, etc., of only the program. In that case, the method of protecting the program with a patent will be realized in the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus, comprising:
an image sensor element for converting light of a subject to image data;
a xenon tube strobe light;
a solid light-emitting element strobe light;
a consecutive imaging controlling section for controlling the image sensor element so that the subject is imaged a plurality of times at a predetermined imaging interval;
a light emission controlling section for controlling the xenon tube strobe light and the solid light-emitting element strobe light so as to emit light during each instance of imaging by the consecutive imaging controlling section; and
a strobe light type setting section for setting a strobe light type;
wherein when the strobe light type setting section sets the strobe light type to an automatically-switched strobe light, the light emission controlling section controls the xenon tube strobe light and the solid light-emitting element strobe light such that the xenon tube strobe light emits light during each instance of imaging by the consecutive imaging controlling section until a number of times that the xenon tube strobe light has emitted light reaches a predetermined number of times, and when the number of times that the xenon tube strobe light has emitted light would exceed the predetermined number of times, the light emission controlling section switches from the xenon tube strobe light to the solid light-emitting element strobe light and controls the solid light-emitting element strobe light to emit light during each subsequent instance of imaging by the consecutive imaging controlling section; and
wherein when the strobe light type setting section sets the strobe light type to the xenon tube strobe light, the light emission controlling section controls only the xenon tube strobe light to emit light and limits the number of times that the xenon tube strobe light emits light to the predetermined number of times, and the consecutive imaging controlling section limits a number of times that imaging is performed at the predetermined imaging interval to the predetermined number of times.

2. The imaging apparatus according to claim 1, comprising:
  a xenon tube strobe light emission amount calculating section for calculating a light emission amount to be emitted by the xenon tube strobe light to achieve an optimal exposure amount; and
  a solid light-emitting element strobe light emission amount calculating section for calculating a light emission amount to be emitted by the solid light-emitting element strobe light to achieve the optimal exposure amount;
  wherein the light emission controlling section controls the xenon tube strobe light such that the xenon tube strobe light emits light with the light emission amount calculated by the xenon tube strobe light emission amount calculating section and controls the solid light-emitting element strobe light such that the solid light-emitting element strobe light emits light with the light emission amount calculated by the solid light-emitting element strobe light emission amount calculating section.

3. The imaging apparatus according to claim 2, further comprising a light emission possibility judging section for judging whether or not the xenon tube strobe light can emit light the predetermined number of times based on the light emission amount calculated by the xenon tube strobe light emission amount calculating section, wherein the predetermined number of times is determined in advance;
  wherein when the light emission possibility judging section judges that the xenon tube strobe light cannot emit light the predetermined number of times, the light emission controlling section controls the xenon tube strobe light such that the xenon tube strobe light emits light with a light emission amount that allows the xenon tube strobe light to emit light the predetermined number of times.

4. The imaging apparatus according to claim 1, wherein when the strobe light type setting section sets the strobe light type to the solid light-emitting element strobe light, the light emission controlling section controls the xenon tube strobe light and the solid light-emitting element strobe light such that only the solid light-emitting element strobe light emits light.

5. The imaging apparatus according to claim 1, wherein the xenon tube strobe light has a capacitor, and the predetermined number of times is a number of times that the xenon tube strobe light can emit light without recharging the capacitor.

6. The imaging apparatus according to claim 5, wherein the predetermined number of times is a number of light emitting times until a voltage at the capacitor first becomes lower than a threshold voltage.

7. The imaging apparatus according to claim 1, comprising:
  a first instructing section for giving an instruction to start imaging; and
  a second instructing section for giving an instruction to end imaging;
  wherein when the first instructing section gives the instruction to start imaging, the consecutive imaging controlling section starts performing control so that the subject is imaged a plurality of times at the predetermined imaging interval, and when the second instructing section gives the instruction to end imaging, the consecutive imaging controlling section stops performing the control.

8. An imaging apparatus, comprising:
  an image sensor element for converting light of a subject to image data;
  a xenon tube strobe light;
  a solid light-emitting element strobe light;
  a consecutive imaging controlling section for controlling the image sensor element so that the subject is imaged a plurality of times at a predetermined imaging interval;
  a light emission controlling section for controlling the xenon tube strobe light and the solid light-emitting element strobe light so as to emit light during each instance of imaging by the consecutive imaging controlling section;
  a strobe light type setting section for setting a strobe light type;
  an imaging interval setting section for setting the imaging interval; and
  an imaging interval judging section for judging whether or not the imaging interval set by the imaging interval setting section is shorter than the predetermined imaging interval;
  wherein when the strobe light type setting section sets the strobe light type to an automatically-switched strobe light, the light emission controlling section controls the xenon tube strobe light and the solid light-emitting element strobe light such that the xenon tube strobe light emits light during each instance of imaging by the consecutive imaging controlling section until a number of times that the xenon tube strobe light has emitted light reaches a predetermined number of times, and when the number of times that the xenon tube strobe light has emitted light would exceed the predetermined number of times, the light emission controlling section switches from the xenon tube strobe light to the solid light-emitting element strobe light and controls the solid light-emitting element strobe light to emit light during each subsequent instance of imaging by the consecutive imaging controlling section; and
  wherein when the imaging interval judging section judges that the imaging interval set by the imaging interval setting section is shorter than the predetermined imaging interval, the light emission controlling section controls the xenon tube strobe light and the solid light-emitting element strobe light such that only the solid light-emitting element strobe light emits light regardless of the strobe light type set by the strobe light type setting section.

9. The imaging apparatus according to claim 8, wherein when the imaging interval judging section judges that the imaging interval set by the imaging interval setting section is shorter than the predetermined imaging interval, the light emission controlling section controls the xenon tube strobe light and the solid light-emitting element strobe light so as to continuously emit only the solid light-emitting element strobe light while the imaging is performed at the set imaging interval by the consecutive imaging controlling section.

10. The imaging apparatus according to claim 8, wherein when the imaging interval judging section judges that the imaging interval set by the imaging interval setting section is shorter than the predetermined imaging interval, the light emission controlling section controls the xenon tube strobe light and the solid light-emitting element strobe light so as to flash only the solid light-emitting element strobe light at a shorter interval than the predetermined imaging interval while the imaging is performed at the set imaging interval by the consecutive imaging controlling section.

11. An imaging apparatus, comprising:
  an image sensor element for converting light of a subject to image data;
  a xenon tube strobe light;
  a solid light-emitting element strobe light;

a consecutive imaging controlling section for controlling the image sensor element so that the subject is imaged a plurality of times at a predetermined imaging interval;

a light emission controlling section for controlling the xenon tube strobe light and the solid light-emitting element strobe light so as to emit light during each instance of imaging by the consecutive imaging controlling section; and a judging section for judging whether or not an optimal exposure amount can be achieved at each instance of imaging by the consecutive imaging controlling section;

wherein when the judging section judges that the optimal exposure amount cannot be achieved, the consecutive imaging controlling section controls the image sensor element to at least one of (i) drive the image sensor element to perform pixel addition and (ii) increase sensitivity of image data acquired through each instance of imaging.

12. An imaging apparatus, comprising:

an image sensor element for converting light of a subject to image data;

a xenon tube strobe light;

a solid light-emitting element strobe light;

a consecutive imaging controlling section for controlling the image sensor element so that the subject is imaged a plurality of times at a predetermined imaging interval;

a light emission controlling section for controlling the xenon tube strobe light and the solid light-emitting element strobe light so as to emit light during each instance of imaging by the consecutive imaging controlling section;

a judging section for judging whether or not an optimal exposure amount can be achieved at each instance of imaging by the consecutive imaging controlling section; and a generating section for generating a single frame of composite image data by performing additive compositing on a plurality of pieces of image data;

wherein when the judging section judges that the optimal exposure amount cannot be achieved, the consecutive imaging controlling section performs control so as to perform sub-imaging a plurality of times during each imaging period that occurs at the predetermined imaging interval, and the generating section performs additive compositing on a plurality of pieces of image data that are sub-imaged during each imaging period to generate a single frame of composite image data for each imaging period.

13. The imaging apparatus according to claim 12, wherein the consecutive imaging controlling section performs control so as to perform the sub-imaging during each imaging period only when the predetermined imaging interval is longer than a constant interval.

* * * * *